United States Patent
Disch et al.

(10) Patent No.: US 10,354,663 B2
(45) Date of Patent: *Jul. 16, 2019

(54) APPARATUS AND METHOD FOR GENERATING AN ENHANCED SIGNAL USING INDEPENDENT NOISE-FILLING

(71) Applicant: Fraunhofer-Gesellschaft zur Förderung der angewandten Forschung e.V., Munich (DE)

(72) Inventors: Sascha Disch, Fürth (DE); Ralf Geiger, Erlangen (DE); Andreas Niedermeier, München (DE); Matthias Neusinger, Rohr (DE); Konstantin Schmidt, Nürnberg (DE); Stephan Wilde, Nürnberg (DE); Benjamin Schubert, Nürnberg (DE); Christian Neukam, Kalchreuth (DE)

(73) Assignee: Fraunhofer-Gesellschaft zur Förderung der angewandten Forschung e.V. (DE)

(*) Notice: Subject to any disclaimer, the term of this patent is extended or adjusted under 35 U.S.C. 154(b) by 4 days.

This patent is subject to a terminal disclaimer.

(21) Appl. No.: 15/353,292

(22) Filed: Nov. 16, 2016

(65) Prior Publication Data
US 2017/0069332 A1 Mar. 9, 2017

Related U.S. Application Data

(63) Continuation of application No. PCT/EP2015/067058, filed on Jul. 24, 2015.

(30) Foreign Application Priority Data

Jul. 28, 2014 (EP) .................................. 14178777

(51) Int. Cl.
G10L 19/00 (2013.01)
G10L 19/028 (2013.01)
(Continued)

(52) U.S. Cl.
CPC ........ G10L 19/028 (2013.01); G10L 19/0204 (2013.01); G10L 21/038 (2013.01); G10L 25/21 (2013.01)

(58) Field of Classification Search
USPC ................................................. 704/226–228
See application file for complete search history.

(56) References Cited

U.S. PATENT DOCUMENTS 8,583,445 B2 11/2013 Oh et al.
2011/0173012 A1* 7/2011 Rettelbach .............. G10L 19/02
704/500
(Continued)

FOREIGN PATENT DOCUMENTS

CN 102136271 A 7/2011
CN 103843062 A 6/2014
(Continued)

OTHER PUBLICATIONS

Office Action and Search Report dated Feb. 15, 2018 issued in parallel RU patent application No. 2017105507 (10 pages with English translation).
(Continued)

Primary Examiner — Leonard Saint Cyr
(74) Attorney, Agent, or Firm — Haynes and Boone, LLP

(57) ABSTRACT

An apparatus for generating an enhanced signal from an input signal, wherein the enhanced signal has spectral values for an enhancement spectral region, the spectral values for the enhancement spectral regions not being contained in the input signal, includes a mapper for mapping a source spectral region of the input signal to a target region in the
(Continued)

enhancement spectral region, the source spectral region including a noise-filling region; and a noise filler configured for generating first noise values for the noise-filling region in the source spectral region of the input signal and for generating second noise values for a noise region in the target region, wherein the second noise values are decorrelated from the first noise values or for generating second noise values for a noise region in the target region, wherein the second noise values are decorrelated from first noise values in the source region.

23 Claims, 17 Drawing Sheets

(51) Int. Cl.
*G10L 21/038* (2013.01)
*G10L 25/21* (2013.01)
*G10L 19/02* (2013.01)

(56) References Cited

U.S. PATENT DOCUMENTS

| | | |
|---|---|---|
| 2011/0305352 A1 | 12/2011 | Villemoes et al. |
| 2013/0006645 A1 | 1/2013 | Jiang et al. |
| 2013/0179175 A1 | 7/2013 | Biswas |
| 2013/0218577 A1 | 8/2013 | Taleb et al. |
| 2013/0248577 A1 | 9/2013 | Leimbach et al. |
| 2013/0290003 A1 | 10/2013 | Choo |
| 2013/0346087 A1 | 12/2013 | Grancharov et al. |
| 2014/0188464 A1 | 7/2014 | Choo |

FOREIGN PATENT DOCUMENTS

| | | |
|---|---|---|
| EP | 2304720 B1 | 11/2011 |
| EP | 2 709 106 A1 | 3/2014 |
| EP | 2 728 577 A2 | 5/2014 |
| EP | 2704142 A1 | 5/2014 |
| RU | 2381572 C2 | 5/2009 |
| RU | 2402827 C2 | 5/2009 |
| TW | 200705389 A | 2/2007 |
| TW | 200713202 A | 4/2007 |
| WO | WO 2006 107834 A1 | 10/2006 |
| WO | WO 2006 107836 A1 | 10/2006 |
| WO | WO 2006 107837 A1 | 10/2006 |
| WO | WO 2006 107838 A1 | 10/2006 |
| WO | WO 2006 107839 A2 | 10/2006 |
| WO | WO2006107833 A1 | 10/2006 |
| WO | WO 2010/003565 A1 | 1/2010 |
| WO | WO2013002623 A2 | 1/2013 |
| WO | WO 2014/033131 | 3/2014 |
| WO | WO 2014/041020 A1 | 3/2014 |

OTHER PUBLICATIONS

Russian Search Report issued with Office Action (2 pages).
S. Meltzer, R. Bohm & F. Henn; SBR enhanced audio codecs for digital broadcasting such as "Digital Radio Mondiale" (DRM); 112$^{th}$ AES Convention Paper 5559; May 10, 2002, pp. 1-4; Audio Engineering Society (Munich, Germany).
T. Ziegler, A. Ehret, P. Ekstrand & M. Lutzky; Enhancing mp3 with SBR: Features and Capabilities of the new mp3PRO Algorithm; 112$^{th}$ AES Convention Paper 5560; May 10, 2002, pp. 1-7; Audio Engineering Society (Munich, Germany).
M. Dietz, L. Liljeryd, K. Kjorling & O. Kunz; Spectral Band Replication, a novel approach in audio coding; 112$^{th}$ AES Convention Paper 5553; May 10, 2002, pp. 1-8; Audio Engineering Society (Munich, Germany).
J. Herre & D. Schulz; Extending the MPEG-4 AAC Codec by Perceptual Noise Substitution; 104$^{th}$ Convention Paper 4720; May 16, 1998, pp. 1-14; Audio Engineering Society (Amsterdam, Netherlands).
ITU-T Recommendations G.719, Series G: Transmission Systems and Media, Digital Systems and Networks—Digital terminal equipments—Coding of analogue signals; International Telecommunication Union (Jun. 2008).
ITU-T Recommendations G.221C, International Analogue Carrier Systems, General Characteristics Common to All Analogue Carrier-Transmission Systems—Overall Recommendations Relating to Carrier-Transmission Systems; International Telecommunication Union (1993).
Taiwan Patent Office Action No. 10521143460 as to Taiwan App. No. 10412376 (dated Sep. 13, 2016).
Provisional patent application (EP13177350.9) titled "Adaptive Spectral Patch Selection Scheme".
Office Action and Search Report issued in parallel Russian patent app. No. 2016146738 dated Mar. 19, 2018 (12 pages with English translation).
Office Action dated May 8, 2018 issued in parallel Japanese patent application No. 2017-504674 (7 pages).
Office Action dated May 8, 2018 issued in parallel Japanese patent application No. 2017-504691.
Takeshi Norimatsu et al., Acoustic Signal Encoding integrating sound and music, Journal of Acoustical Society of Japan Mar. 1, 2012, vol. 68, Issue 3, p. 123-128.
Frederik Nagel, et al., A Harmonic Bandwidth Extension Method for Audio Codecs, Proceedings of the 2009 IEEE International Conference on Acoustics, Speech and Signal Processing (ICASSP 2009), Jan. 2009, p. 145-148.
Notice of Acceptance dated Jul. 6, 2018 issued in parallel Australian patent application No. 2015295547 (3 pages).
Decision to Grant dated Jun. 18, 2018 issued in parallel Russian patent application No. 2017105507 (19 pages).
Office Action dated May 18, 2018 issued in related U.S. Appl. No. 15/414,430 (37 pages).
Decision to Grant issued in the parallel Korean patent application No. 10-2017-7002410 dated Dec. 13, 2018 (8 pages with English translations).
Decision to Grant issued in the parallel Korean patent application No. 10-2017-7004851 dated Dec. 13, 2018 (8 pages with English translations).
Office Action and Search Report dated Mar. 13, 2019 in the parallel European Union patent App No. 18209545.5-1210.
Herre, Jurgen and Schultz, Donald: Extending the MPEG-4 AAC Codec by Perceptual Noise Substitution, Fraunhofer Institute for Integrated Circuits, 1998 (pp. 1-14).
Mehrotra, Sanjeev, et al: Hybrid Low Bitrate Audio Coding Using Adaptive Gain Shape Vector Quantization, Microsoft Corporation (2008) (pp. 927-932).
Mar. 1, 2019 China Office Action issued for parallel China App. 201580040119.4 (7 pages), with English translation (9 pages).

* cited by examiner

| SCB1 | SCB2 | SCB3 | SCB4 | SCB5 | SCB6 | SCB7 |
|------|------|------|------|------|------|------|
| SF1 | SF2 | SF3 | SF4 | SF5 | SF6 | SF7 |
| | | | $E_1$ | $E_2$ | $E_3$ | $E_4$ |
| | $NF_2$ | | | | | |

308  310  312

FIG 3B (QUANTIZER PROCESSOR)

(OTHER SPECTRAL PORTIONS)

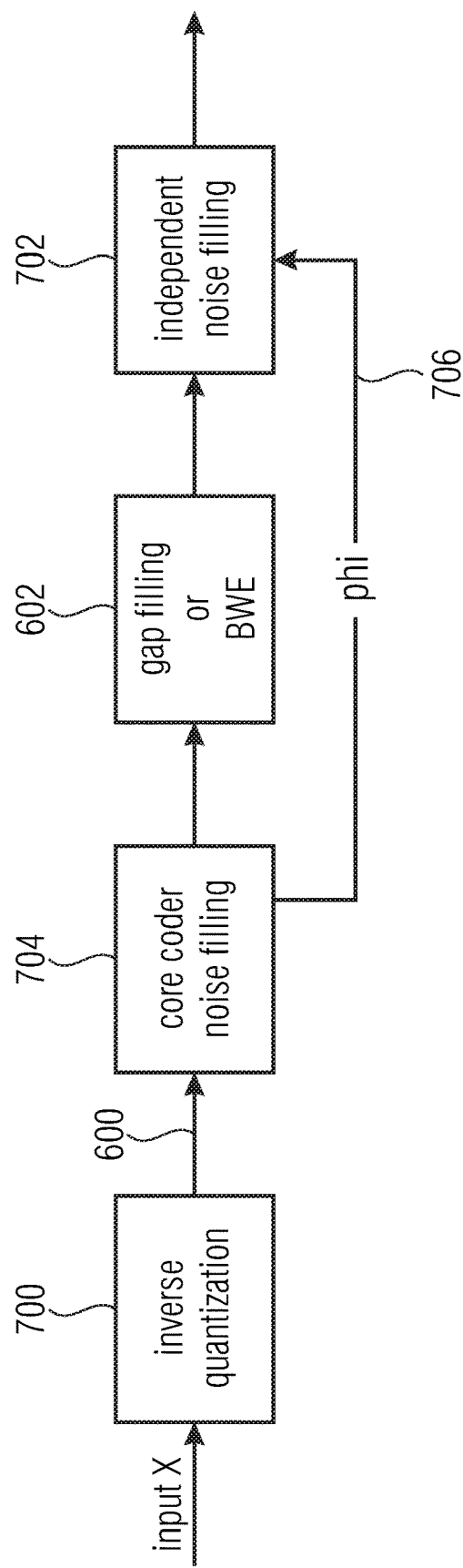
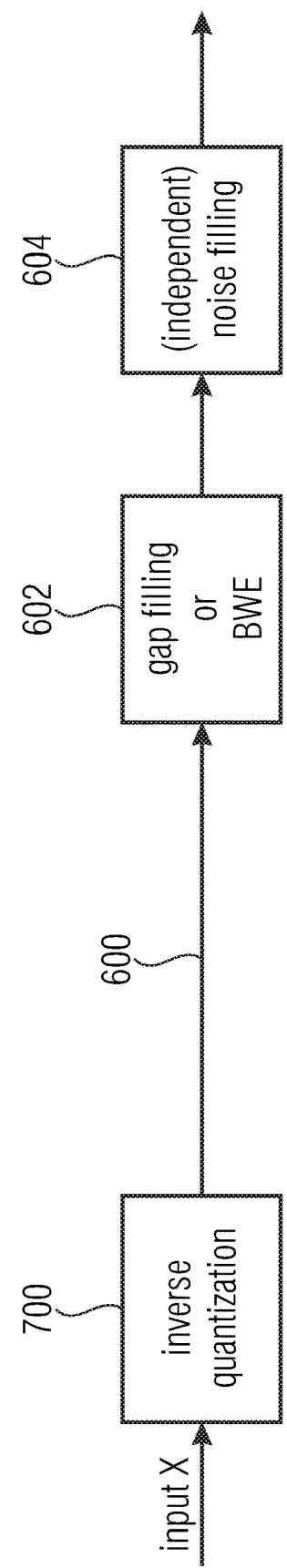
FIG 7
FIG 8

APPARATUS AND METHOD FOR GENERATING AN ENHANCED SIGNAL USING INDEPENDENT NOISE-FILLING

CROSS-REFERENCE TO RELATED APPLICATIONS

This application is a continuation of co-pending International Application No. PCT/EP2015/067058, filed Jul. 24, 2015, which is incorporated herein by reference in its entirety, and additionally claims priority to European Application No. EP14178777.0, filed Jul. 28, 2014, which is also incorporated herein by reference in its entirety.

BACKGROUND OF THE INVENTION

The application is related to signal processing, and particularly, to audio signal processing.

The perceptual coding of audio signals for the purpose of data reduction for efficient storage or transmission of these signals is a widely used practice. In particular when lowest bit rates are to be achieved, the employed coding leads to a reduction of audio quality that often is primarily caused by a limitation at the encoder side of the audio signal bandwidth to be transmitted. In contemporary codecs well-known methods exist for the decoder-side signal restoration through audio signal Band Width Extension (BWE), e.g. Spectral Band Replication (SBR).

In low bit rate coding, often also so-called noise-filling is employed. Prominent spectral regions that have been quantized to zero due to strict bitrate constraints are filled with synthetic noise in the decoder.

Usually, both techniques are combined in low bitrate coding applications. Moreover, integrated solutions such as Intelligent Gap Filling (IGF) exist that combine audio coding, noise-filling and spectral gap filling.

However, all these methods have in common that in a first step the baseband or core audio signal is reconstructed using waveform decoding and noise-filling, and in a second step the BWE or the IGF processing is performed using the readily reconstructed signal. This leads to the fact that the same noise values that have been filled in the baseband by noise-filling during reconstruction are used for regenerating the missing parts in the highband (in BWE) or for filling remaining spectral gaps (in IGF). Using highly correlated noise for reconstructing multiple spectral regions in BWE or IGF may lead to perceptual impairments.

Relevant topics in the state-of-art comprise
SBR as a post processor to waveform decoding [1-3]
AAC PNS [4]
MPEG-D USAC noise-filling [5]
G.719 and G.722.1C [6]
MPEG-H 3D IGF [8]
The following papers and patent applications describe methods that are considered to be relevant for the application:
[1] M. Dietz, L. Liljeryd, K. Kjörling and O. Kunz, "Spectral Band Replication, a novel approach in audio coding," in 112th AES Convention, Munich, Germany, 2002.
[2] S. Meltzer, R. Böhm and F. Henn, "SBR enhanced audio codecs for digital broadcasting such as "Digital Radio Mondiale" (DRM)," in 112th AES Convention, Munich, Germany, 2002.
[3] T. Ziegler, A. Ehret, P. Ekstrand and M. Lutzky, "Enhancing mp3 with SBR: Features and Capabilities of the new mp3PRO Algorithm," in 112th AES Convention, Munich, Germany, 2002.
[4] J. Herre, D. Schulz, Extending the MPEG-4 AAC Codec by Perceptual Noise Substitution, Audio Engineering Society 104th Convention, Preprint 4720, Amsterdam, Netherlands, 1998
[5] European Patent application EP2304720 USAC noise-filling
[6] ITU-T Recommendations G.719 and G.221C
[7] EP 2704142
[8] EP 13177350

Audio signals processed with these methods suffer from artifacts such as roughness, modulation distortions and a timbre perceived as unpleasant, in particular at low bit rate and consequently low bandwidth and/or the occurrence of spectral holes in the LF range. The reason for this is, as will be explained below, primarily the fact that the reconstructed components of the extended or gap filled spectrum are based on one or more direct copies containing noise from the baseband. The temporal modulations resulting from said unwanted correlation in reconstructed noise are audible in a disturbing manner as perceptual roughness or objectionable distortion. All existing methods like mp3+SBR, AAC+SBR, USAC, G.719 and G.722.1C, and also MPEG-H 3D IGF first do a complete core decoding including noise-filling before filling spectral gaps or the highband with copied or mirrored spectral data from the core.

SUMMARY

According to an embodiment, an apparatus for generating an enhanced signal from an input signal, wherein the enhanced signal has spectral values for an enhancement spectral region, the spectral values for the enhancement spectral regions not being contained in the input signal, may have: a mapper for mapping a source spectral region of the input signal to a target region in the enhancement spectral region, the source spectral region including a noise-filling region; and a noise filler configured for generating first noise values for the noise-filling region in the source spectral region of the input signal and for generating second noise values for a noise region in the target region, wherein the second noise values are decorrelated from the first noise values or for generating second noise values for a noise region in the target region, wherein the second noise values are decorrelated from first noise values in the source region, wherein the noise filler is configured for: identifying the noise-filling region having the first noise values in the input signal; copying at least a region of the input signal to a source tile buffer, the region including the source spectral region; replacing the first noise values as identified by the independent noise values; and wherein the mapper is configured to map the source tile buffer having decorrelated noise values to the target region.

According to another embodiment, a method of generating an enhanced signal from an input signal, wherein the enhanced signal has spectral values for an enhancement spectral region, the spectral values for the enhancement spectral regions not being contained in the input signal, may have the steps of: mapping a source spectral region of the input signal to a target region in the enhancement spectral region, the source spectral region including a noise-filling region; and generating first noise values for the noise-filling region in the source spectral region of the input signal and for generating second noise values for a noise region in the target region, wherein the second noise values are decorrelated from the first noise values or for generating second noise values for a noise region in the target region, wherein the second noise values are decorrelated from first noise values in the source region, wherein the generating includes: identifying the noise-filling region having the first noise values in the input signal; copying at least a region of the input signal to a source tile buffer, the region including the source spectral region; and replacing the first noise values as identified by the independent noise values; and wherein the mapping includes mapping the source tile buffer having decorrelated noise values to the target region.

According to another embodiment, a system for processing an audio signal may have: an encoder for generating an encoded signal; and the inventive apparatus for generating an enhanced signal, wherein the encoded signal is subjected to a processing in order to generate the input signal into the apparatus for generating the enhanced signal.

According to another embodiment, a method for processing an audio signal may have the steps of: generating an encoded signal from an input signal; and a method of generating an enhanced signal from an input signal, wherein the enhanced signal has spectral values for an enhancement spectral region, the spectral values for the enhancement spectral regions not being contained in the input signal, having the steps of: mapping a source spectral region of the input signal to a target region in the enhancement spectral region, the source spectral region including a noise-filling region; and generating first noise values for the noise-filling region in the source spectral region of the input signal and for generating second noise values for a noise region in the target region, wherein the second noise values are decorrelated from the first noise values or for generating second noise values for a noise region in the target region, wherein the second noise values are decorrelated from first noise values in the source region, wherein the generating includes: identifying the noise-filling region having the first noise values in the input signal; copying at least a region of the input signal to a source tile buffer, the region including the source spectral region; and replacing the first noise values as identified by the independent noise values; and wherein the mapping includes mapping the source tile buffer having decorrelated noise values to the target region, wherein the encoded signal is subjected to a predefined processing in order to generate the input signal into the apparatus for generating the enhanced signal.

Another embodiment may have a non-transitory digital storage medium having a computer program stored thereon to perform the method of generating an enhanced signal from an input signal, wherein the enhanced signal has spectral values for an enhancement spectral region, the spectral values for the enhancement spectral regions not being contained in the input signal, the method having the steps of: mapping a source spectral region of the input signal to a target region in the enhancement spectral region, the source spectral region including a noise-filling region; and generating first noise values for the noise-filling region in the source spectral region of the input signal and for generating second noise values for a noise region in the target region, wherein the second noise values are decorrelated from the first noise values or for generating second noise values for a noise region in the target region, wherein the second noise values are decorrelated from first noise values in the source region, wherein the generating includes: identifying the noise-filling region having the first noise values in the input signal; copying at least a region of the input signal to a source tile buffer, the region including the source spectral region; and replacing the first noise values as identified by the independent noise values; and wherein the mapping includes mapping the source tile buffer having decorrelated noise values to the target region, when said computer program is run by a computer.

Another embodiment may have a non-transitory digital storage medium having a computer program stored thereon to perform the method for processing an audio signal, the method having the steps of: generating an encoded signal from an input signal; and a method of generating an enhanced signal from an input signal, wherein the enhanced signal has spectral values for an enhancement spectral region, the spectral values for the enhancement spectral regions not being contained in the input signal, including: mapping a source spectral region of the input signal to a target region in the enhancement spectral region, the source spectral region including a noise-filling region; and generating first noise values for the noise-filling region in the source spectral region of the input signal and for generating second noise values for a noise region in the target region, wherein the second noise values are decorrelated from the first noise values or for generating second noise values for a noise region in the target region, wherein the second noise values are decorrelated from first noise values in the source region, wherein the generating includes: identifying the noise-filling region having the first noise values in the input signal; copying at least a region of the input signal to a source tile buffer, the region including the source spectral region; and replacing the first noise values as identified by the independent noise values; and wherein the mapping includes mapping the source tile buffer having decorrelated noise values to the target region, wherein the encoded signal is subjected to a predefined processing in order to generate the input signal into the apparatus for generating the enhanced signal, when said computer program is run by a computer.

The present invention is based on the finding that a significant improvement of the audio quality of an enhanced signal generated by bandwidth extension or intelligent gap filling or any other way of generating an enhanced signal having spectral values for an enhancement spectral region being not contained in an input signal is obtained by generating first noise values for a noise-filling region in a source spectral region of the input signal and by then generating second independent noise values for a noise region in the destination or target region, i.e., in the enhancement region which now has noise values, i.e., the second noise values that are independent from the first noise values.

Thus, the conventional problem with having dependent noise in the baseband and the enhancement band due to the spectral values mapping is eliminated and the related problems with artifacts such as roughness, modulation distortions and a timbre perceived as unpleasant particularly at low bitrates are eliminated.

In other words, the noise-filling of second noise values being decorrelated from the first noise values, i.e., noise values which are at least partly independent from the first noise values makes sure that artifacts do not occur anymore or are at least reduced with respect to conventional technology. Hence, the conventional processing of noise-filling spectral values in the baseband by a straightforward bandwidth extension or intelligent gap filling operation does not decorrelate the noise from the baseband, but only changes the level, for example. However, introducing decorrelated noise values in the source band on the one hand and in the target band on the other hand, advantageously derived from a separate noise process provides the best results. However, even the introduction of noise values being not completely decorrelated or not completely independent, but being at least partly decorrelated such as by a decorrelation value of 0.5 or less when the decorrelation value of zero indicates completely decorrelated, improves the full correlation problem of conventional technology.

Hence, embodiments relate a combination of waveform decoding, bandwidth extension or gap filling and noise-filling in a perceptual decoder.

Further advantages are that, in contrast to already existing concepts, the occurrence of signal distortions and perceptual roughness artifacts, which currently are typical for calculating bandwidth extensions or gap filling subsequent to waveform decoding and noise-filling are avoided.

This is due to, in some embodiments, a change in the order of the mentioned processing steps. It is advantageous to perform bandwidth extension or gap filling directly after waveform decoding and it is furthermore advantageous to compute the noise-filling subsequently on the already reconstructed signal using uncorrelated noise.

In further embodiments, waveform decoding and noise-filling can be performed in a traditional order and further downstream in the processing, the noise values can be replaced by appropriately scaled uncorrelated noise.

Hence, the present invention addresses the problems that occur due to a copy operation or a mirror operation on noise-filled spectra by shifting the noise-filling step to a very end of a processing chain and using uncorrelated noise for the patching or gap filling.

BRIEF DESCRIPTION OF THE DRAWINGS

Embodiments of the present invention will be detailed subsequently referring to the appended drawings, in which:

FIG. 1b illustrates a decoder for decoding an encoded audio signal matching with the encoder of FIG. 1a;

FIG. 3b illustrates a table indicating the relation between scale factors for scale factor bands and energies for reconstruction bands and noise-filling information for a noise-filling band;

FIG. 4b illustrates an implementation of the functionality of FIG. 4a;

FIG. 7 illustrates a signal flow of independent noise-filling steered by a selection information in a decoder in accordance with an embodiment of the present invention;

FIG. 8 illustrates a signal flow of an independent noise-filling implemented through an exchanged order of gap filling or bandwidth extension and noise-filling in a decoder;

DETAILED DESCRIPTION OF THE INVENTION

Figure 6:
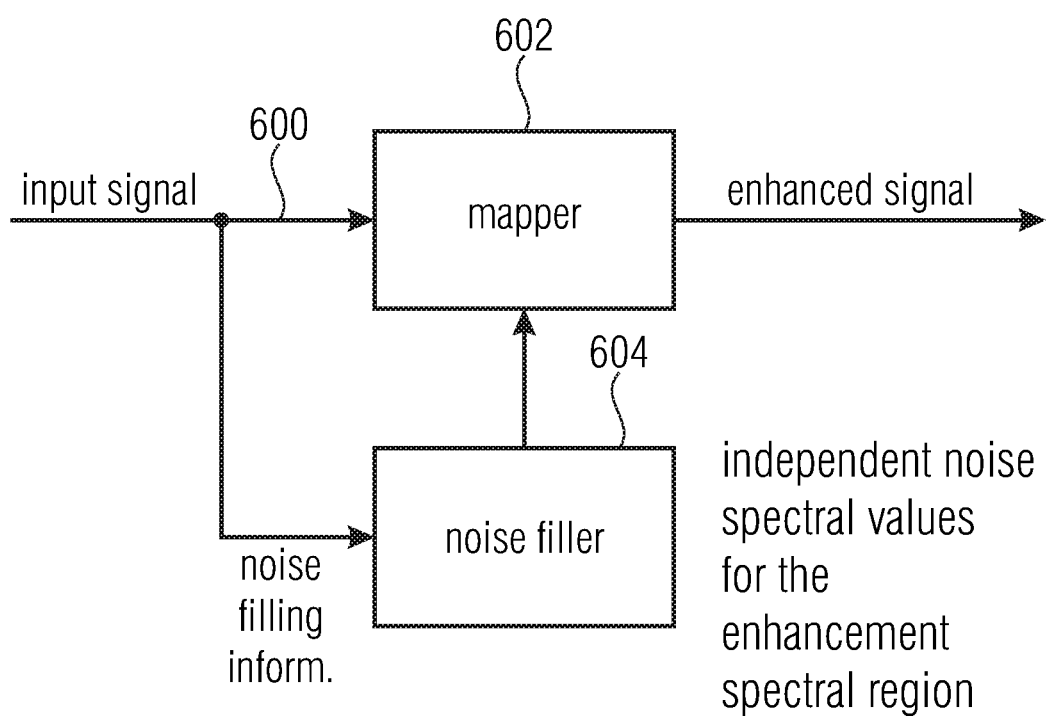
FIG. 6 illustrates a block diagram of an apparatus for generating an enhanced signal in accordance with the present invention.

FIG. 6 illustrates an apparatus for generating an enhanced signal such as an audio signal from an input signal which can also be an audio signal. The enhanced signal has spectral values for an enhancement spectral region, wherein the spectral values for the enhancement spectral region are not contained in the original input signal at an input signal input 600. The apparatus comprises a mapper 602 for mapping a source spectral region of the input signal to a target region in the enhancement spectral region, wherein the source spectral region comprises a noise-filling region.

Furthermore, the apparatus comprises a noise filler 604 configured for generating first noise values for the noise-filling region in the source spectral region of the input signal and for generating second noise values for a noise region in the target region, wherein the second noise values, i.e., the noise values in the target region are independent or uncorrelated or decorrelated from the first noise values in the noise-filling region.

One embodiment relates to a situation, in which noise filling is actually performed in the base band, i.e., in which the noise values in the source region have been generated by noise filling. In a further alternative, it is assumed that a noise filling in the source region has not been performed. Nevertheless the source region has a noise region actually filled with noise like spectral values exemplarily encoded as spectral values by the source or core encoder. Mapping this noise like source region to the enhancement region would also generate dependent noise in source and target regions. In order to address this issue, the noise filler only fills noise into the target region of the mapper, i.e. generates second noise values for the noise region in the target region, wherein the second noise values are decorrelated from first noise values in the source region. This replacement or noise filling can also take place either in a source tile buffer or can take place in the target itself. The noise region can be identified by the classifier either by analyzing the source region or by analyzing the target region.

Figure 3A:
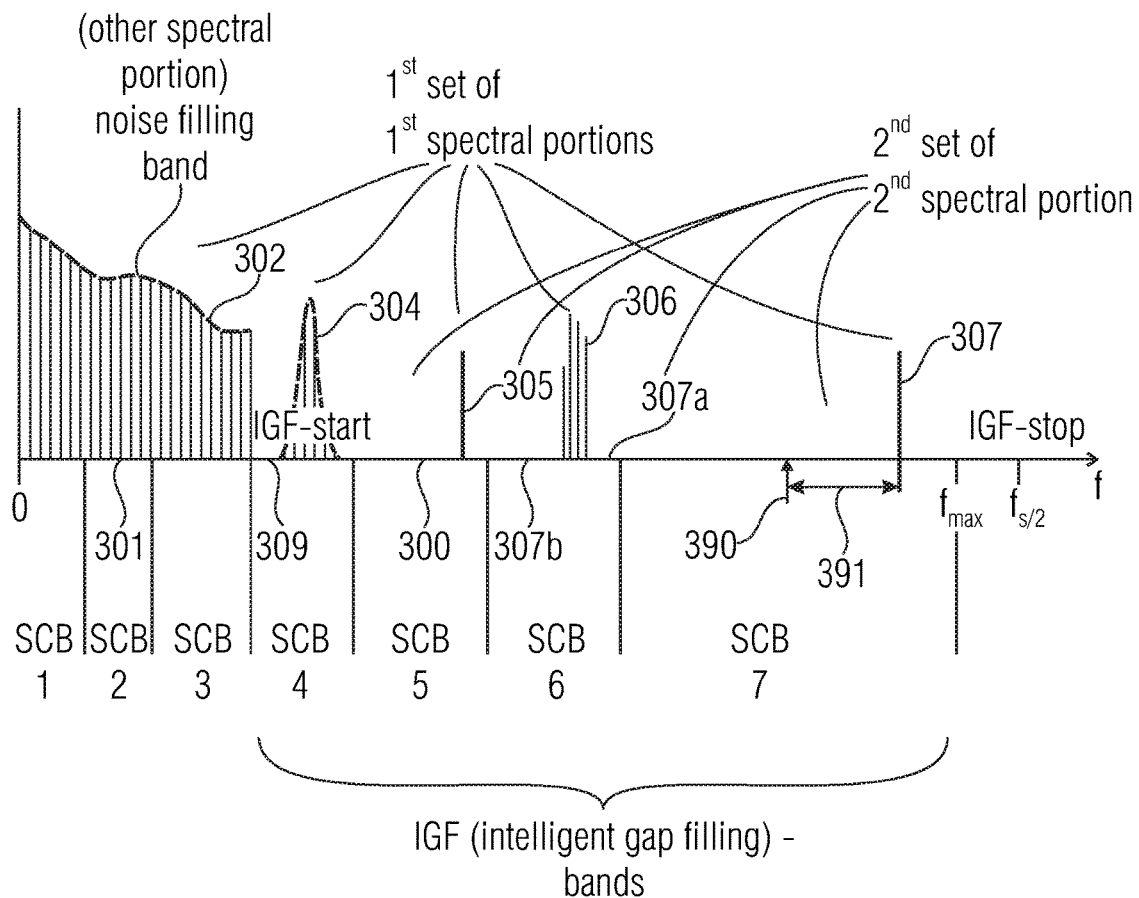
FIG. 3a illustrates a schematic representation of a spectrum as generated by the spectral domain decoder of FIG. 1b.

To this end, reference is made to FIG. 3A. FIG. 3A illustrates as filling region such as scale factor band 301 in the input signal, and the noise filler generates the first noise spectral values in this noise-filling band 301 in a decoding operation of the input signal.

Furthermore, this noise-filling band 301 is mapped to a target region, i.e., in accordance with conventional technology, the generated noise values are mapped to the target region and, therefore, the target region would have dependent or correlated noise with the source region.

In accordance with the present invention, however, the noise filler 604 of FIG. 6 generates second noise values for a noise region in the destination or target region, where the second noise values are decorrelated or uncorrelated or independent from the first noise values in the noise-filling band 301 of FIG. 3A.

Figure 13A:
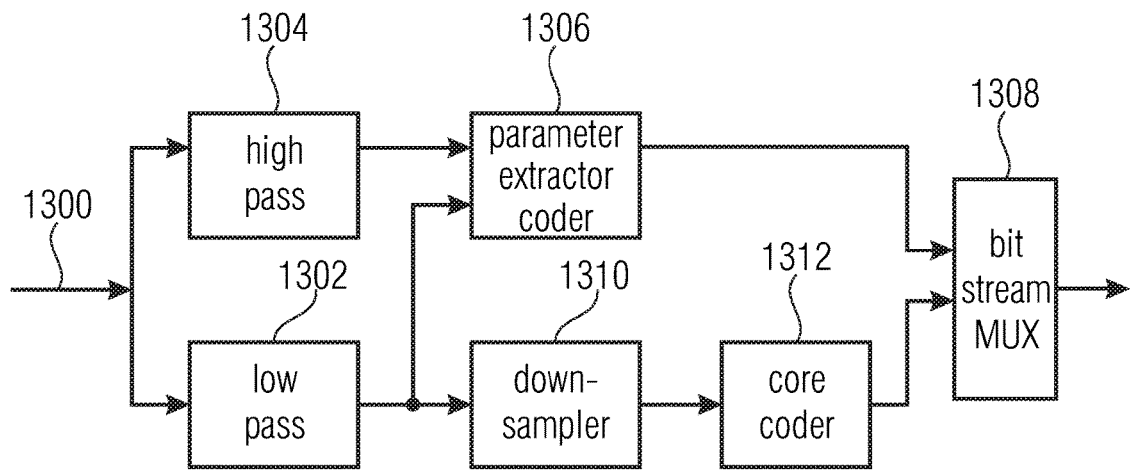
FIG. 13a illustrates an encoder with a bandwidth extension parameter calculation.
Figure 13B:
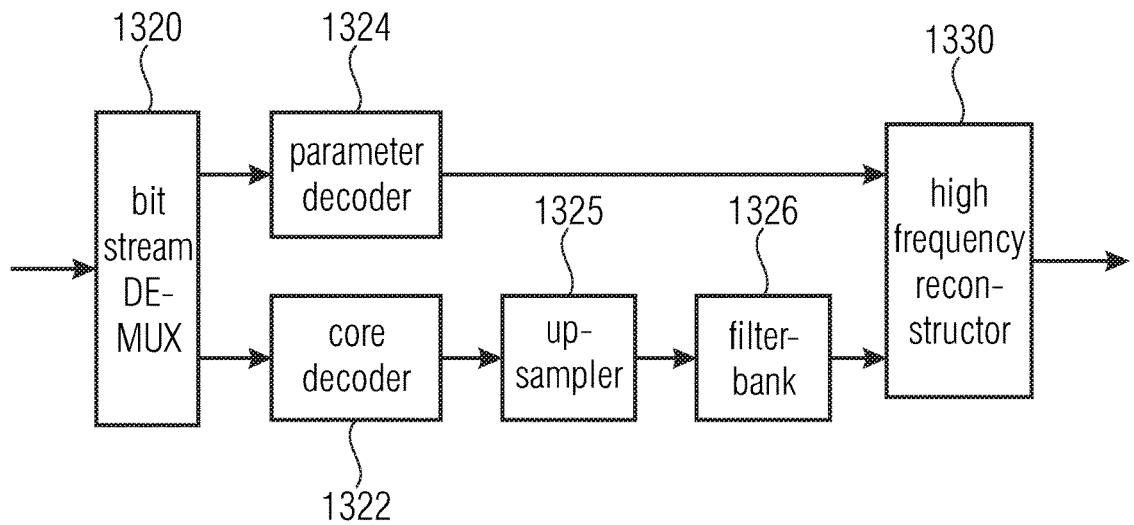
FIG. 13b illustrates a decoder with a bandwidth extension implemented as a post-processor rather than an integrated procedure as in FIG. 1a or 1b.

Generally, the noise-filling and the mapper for mapping the source spectral region to a destination region may be included within a high frequency regenerator as illustrated in the context of FIGS. 1A to 5C exemplarily within an integrated gap filling or can be implemented as a post-processor as illustrated in FIG. 13B and the corresponding encoder in FIG. 13A.

Generally, an input signal is subjected to an inverse quantization 700 or any other or additional predefined decoder processing 700 which means that, at the output of block 700, the input signal of FIG. 6 is obtained, so that the input into the core coder noise-filling block or noise filler block 704 is the input 600 of FIG. 6. The mapper in FIG. 6 corresponds to the gap filling or bandwidth extension block 602 and the independent noise-filling block 702 is also included within the noise filler 604 of FIG. 6. Thus, blocks 704 and 702 are both included in the noise filler block 604 of FIG. 6 and block 704 generates the so-called first noise values for a noise region in the noise-filling region and block 702 generates the second noise values for a noise region in the destination or target region, which is derived from the noise-filling region in the baseband by bandwidth extension performed by the mapper or gap filling or bandwidth extension block 602. Furthermore, as discussed later on, the independent noise-filling operation performed by block 702 is controlled by a control vector PHI illustrated by a control line 706.

1. Step: Noise Identification

In a first step all spectral lines which represent noise in a transmitted audio frame are identified. The identification process may be controlled by already existing, transmitted knowledge of noise positions used by noise-filling [4][5] or may be identified with an additional classifier. The result of noise line identification is a vector containing zeroes and ones where a position with a one indicates a spectral line which represents noise.

In mathematical terms this procedure can be described as:

Let $\hat{X} \in \mathbb{C}^N$ be a transmitted and re-quantized spectrum after noise-filling [4][5] of a transform coded, windowed signal of length $N \in \mathbb{N}$. Let $m \in \mathbb{N}$, $0 < m \leq N$, be the stop line of the whole decoding process.

The classifier $C_0$ determines spectral lines where noise-filling [4][5] in the core region is used:

$$C_0: \mathbb{C}^N \to \{0, 1\}^m,$$

$$\varphi[i] := C_0(\hat{X})[i] := \begin{cases} 1 & \text{on } \hat{X}[i] \text{ noisefilling was used} \\ 0 & \text{else} \end{cases},$$

$$0 \leq i < m \leq N,$$

and the result $\varphi \sigma [0,1]^m$ is a vector of length m.

An additional classifier $C_1$ may identify further lines in $\hat{X}$ which represents noise. This classifier can be described as:

$$C_1: \mathbb{C}^N \times \{0, 1\}^m \to \{0, 1\}^m,$$

$$\varphi[i] := C_1(\hat{X}, \varphi)[i] := \begin{cases} 1 & \text{if } \varphi[i] = 1 \vee \hat{X}[i] \text{ is classified as noise} \\ 0 & \text{else} \end{cases},$$

$$0 \leq i < m \leq N.$$

After the noise identification process the noise indication vector $\varphi \sigma [0,1]^m$ is defined as:

$$\varphi[i] = \begin{cases} 1, & \text{the spectral line } \hat{X}[i] \text{ is identified as a noise line} \\ 0, & \text{the spectral line } \hat{X}[i] \text{ is not identified as a noise line} \end{cases},$$

$$0 \leq i < m \leq N.$$

2. Step: Independent Noise

In the second step a specific region of the transmitted spectrum is selected and copied to a source tile. Within this source tile the identified noise is replaced by random noise. The energy of the inserted random noise is adjusted to the same energy of the original noise in the source tile.

In mathematical terms this procedure can be described as:

Let n, n<m, be the start line for the copy up process, described in Step 3. Let $\hat{X}_{sT} \subset \hat{X}$ be a continuous part of a transmitted spectrum $\hat{X}$, representing a source tile of length $\gamma < n$, which contains the spectral lines $l_{k1}l_{k+1}, \sigma l_{k+7=1}$ of $\hat{X}$, where k is the index of the first spectral line in the source tile $\hat{X}_{sT}$, so that $\hat{X}_{sT}[t] = l_{k+o} 0 \leq t < \gamma$. Furthermore, let $\varphi' \subset \varphi$, so that $\varphi'[t] = \varphi[k+t]$, $0 \leq t < \gamma$.

The identified noise is now replaced by random generated synthetic noise. In order to keep the spectral energy at the same level, the energy E of noise indicated by $\varphi$ is first calculated:

$$E := \sum_{i=0}^{v-1} \varphi'[i] |\hat{X}_{sT}[i]|^2.$$

If $E = \varphi$ skip independent noise replacement for the source tile $\hat{X}_{sT}$, else replace the noise indicated by $\varphi'$:

$$\hat{X}'_{sT}[i] := \begin{cases} r[i], & \varphi'[i] = 1 \\ \hat{X}_{sT}[i], & \varphi'[i] = 0 \end{cases}, 0 \leq i < v,$$

where $r[t]\sigma$ is a random number for all $0 \leq t < \gamma$.

Then calculate the energy E' of the inserted random numbers:

$$E' := \sum_{i=0}^{v-1} \varphi[i]' |\hat{X}'_{sT}[i]|^2.$$

If E'>0 calculate a factor g, else set g=0:

$$g := \sqrt{\frac{E}{E'}}.$$

With g, rescale the replaced noise:

$$\hat{X}''_{sT}[i] := \begin{cases} g\hat{X}'_{sT}[i], & \varphi'[i] = 1 \\ \hat{X}'_{sT}[i], & \varphi'[i] = 0 \end{cases}, 0 \leq i < v.$$

After noise replacement the source tile $\hat{X}''_{sT}[i]$ contains noise lines which are independent from noise lines in $\hat{X}$.

3. Step: Copy Up

The source tile $\hat{X}''_{sT}[i]$ is mapped to its destination region in $\hat{X}$:

$$\hat{X}[c+t] = \hat{X}''_{sT}[t], 0 \leq t < \gamma, c \geq n, c+t < m < N,$$

or, if the IGF scheme [8] is used:

$$\hat{X}[c+i] = \begin{cases} \hat{X}''_{sT}[i], & \hat{X}[c+i] = 0 \\ \hat{X}[c+i], & \hat{X}[c+i] <> 0 \end{cases}, 0 \le i < v, c \ge n,$$

$$c+i<m<N.$$

Figure 1A:
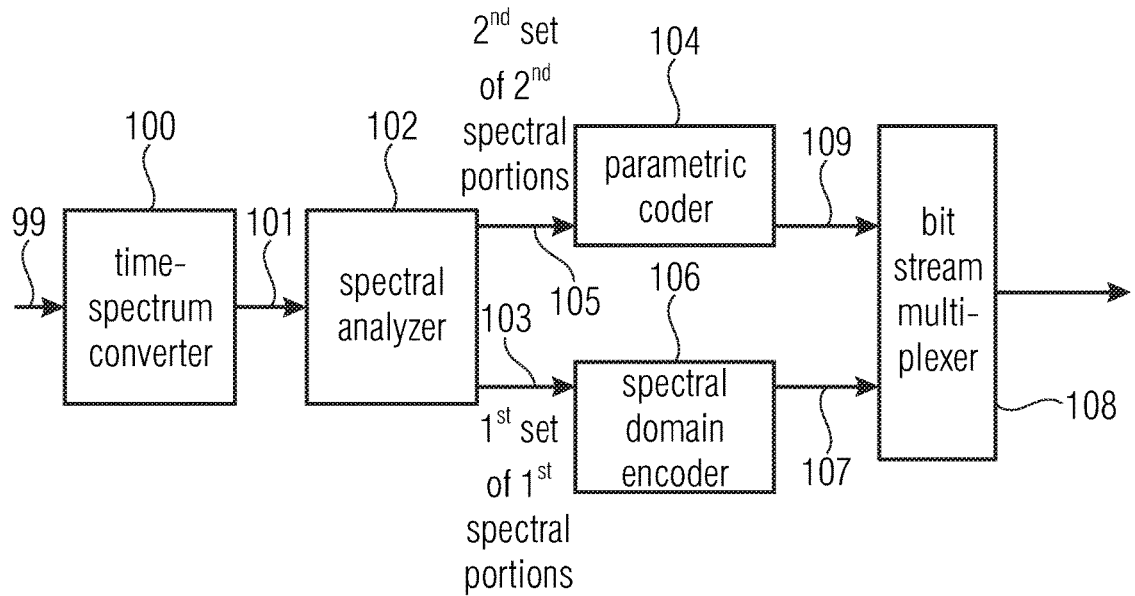
FIG. 1a illustrates an apparatus for encoding an audio signal.
Figure 1B:
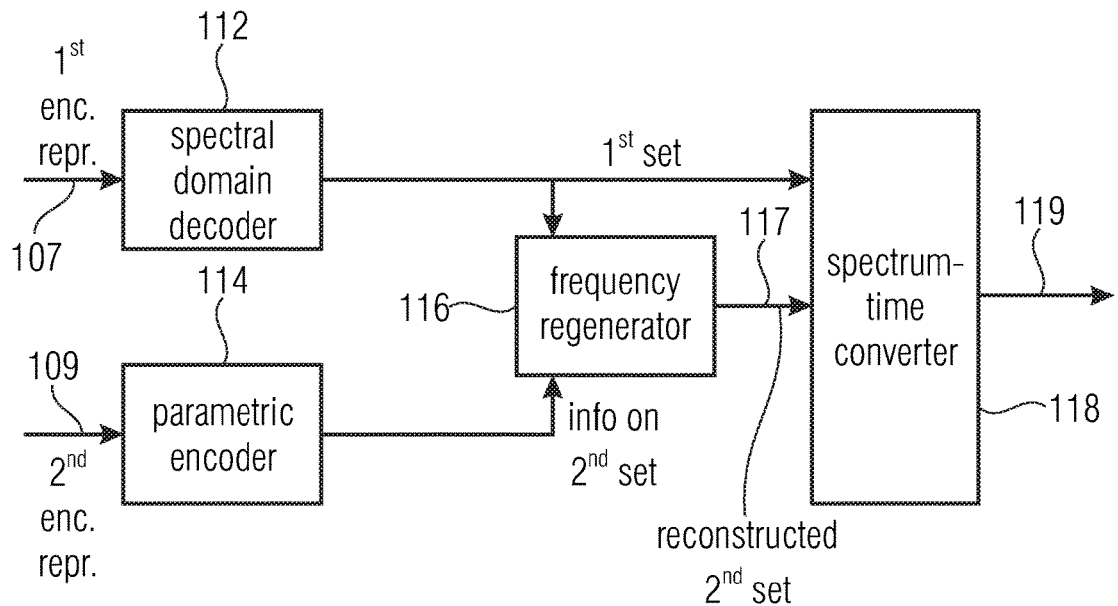

FIG. 8 illustrates an embodiment, in which, subsequent to any post-processing such as the spectral domain decoding illustrated in block 112 in FIG. 1B or, in the post-processor embodiment illustrated by block 1326 in FIG. 13B, the input signal is subjected to a gap filling or bandwidth extension first, i.e., is subjected to a mapping operation first and, then, an independent noise-filling is performed afterwards, i.e., within the full spectrum.

The process described in the above context of FIG. 7 can be done as an in place operation, so that the intermediate buffer $\hat{X}_{sT}^r$ is not needed. Therefore the order of execution is adapted.

Execute the first Step as described in the context of FIG. 7, again the set of spectral lines k, k+1, ..., k+γ−1 of $\hat{X}$ are the source region. Perform:

2. Step: Copy Up $$\hat{X}[c+t]=X[k+t], 0 \le t < \gamma, c \ge n, 0 < k+i < n, c+t<m<N,$$

or, if the IGF scheme [8] is used:

$$X[c+i] = \begin{cases} \hat{X}[k+i], & \hat{X}[c+i] = 0 \\ \hat{X}[c+i], & \hat{X}[c+i] <> 0 \end{cases}$$

$$0 \le i < \gamma, c \ge n, 0 < k+t<n, c+t<m<N.$$

3. Step: Independent Noise-Filling

Perform legacy noise-filling up to n and calculate the energy of noise spectral lines in the source region k, k+1, ..., k+γ−1:

$$E := \sum_{i=0}^{v-1} \varphi[k+i]|\hat{X}[k+i]|^2.$$

Perform independent noise-filling in the gap filling or BWE spectral region:

$$\hat{X}[c+i] := \begin{cases} r[i], & \varphi[k+i] = 1 \\ \hat{X}[c+i], & \varphi[k+i] = 0 \end{cases}, 0 \le i < v,$$

where r[t], 0≤t<γ again is a set of random numbers.

Calculate the energy E' of the inserted random numbers:

$$E' := \sum_{i=0}^{v-1} \varphi[k+i]|X[c+i]|^2,$$

Again, i
f E'>0 calculate the factor g, else set g'=0:

$$g := \sqrt{\frac{E}{E'}}.$$

With g, rescale the replaced noise:

$$\hat{X}[c+i] := \begin{cases} g\hat{X}[c+i], & \varphi[k+i] = 1 \\ \hat{X}[c+i], & \varphi[k+i] = 0 \end{cases}, 0 \le i < v.$$

The inventive independent noise-filling can be used in a stereo channel pair environment as well. Therefore the encoder calculates the appropriate channel pair representation, L/R or M/S, per frequency band and optional prediction coefficients. The decoder applies independent noise-filling as described above to the appropriately chosen representation of the channels prior to the subsequent computation of the final conversion of all frequency bands into L/R representation.

The invention is applicable or suitable for all audio applications in which the full bandwidth is not available or that use gap filling for filling spectral holes. The invention may find use in the distribution or broadcasting of audio content such as, for example with digital radio, Internet streaming and audio communication applications.

Subsequently, embodiments of the present invention are discussed with respect to FIGS. 9-12. In step 900, noise regions are identified in the source range. This procedure, which has been discussed before with respect to "Noise Identification" can rely on the noise-filling side information received from an encoder-side fully or can also be configured to alternatively or additionally rely on the signal analysis of the input signal already generated, but without spectral values for the enhancement spectral region, i.e., without the spectral values for this enhancement's spectral region.

Then, in step 902, the source range which has already been subjected to straightforward noise-filling as known in the art, i.e., a complete source range is copied to a source tile buffer.

Then, in step 904, the first noise values, i.e., the straightforward noise values generated within the noise-filling region of the input signal are replaced in the source tile buffer by random values. Then, in step 906, these random values are scaled in the source tile buffer to obtain the second noise values for the target region. Then, in step 908, the mapping operation is performed, i.e., their content of the source tile buffer available subsequent to steps 904 and 906 is mapped to the destination range. Thus, by means of the replacement operation 904, and subsequent to the mapping operation 908, the independent noise-filling operation in the source range and in the target range have been obtained.

Figure 9:
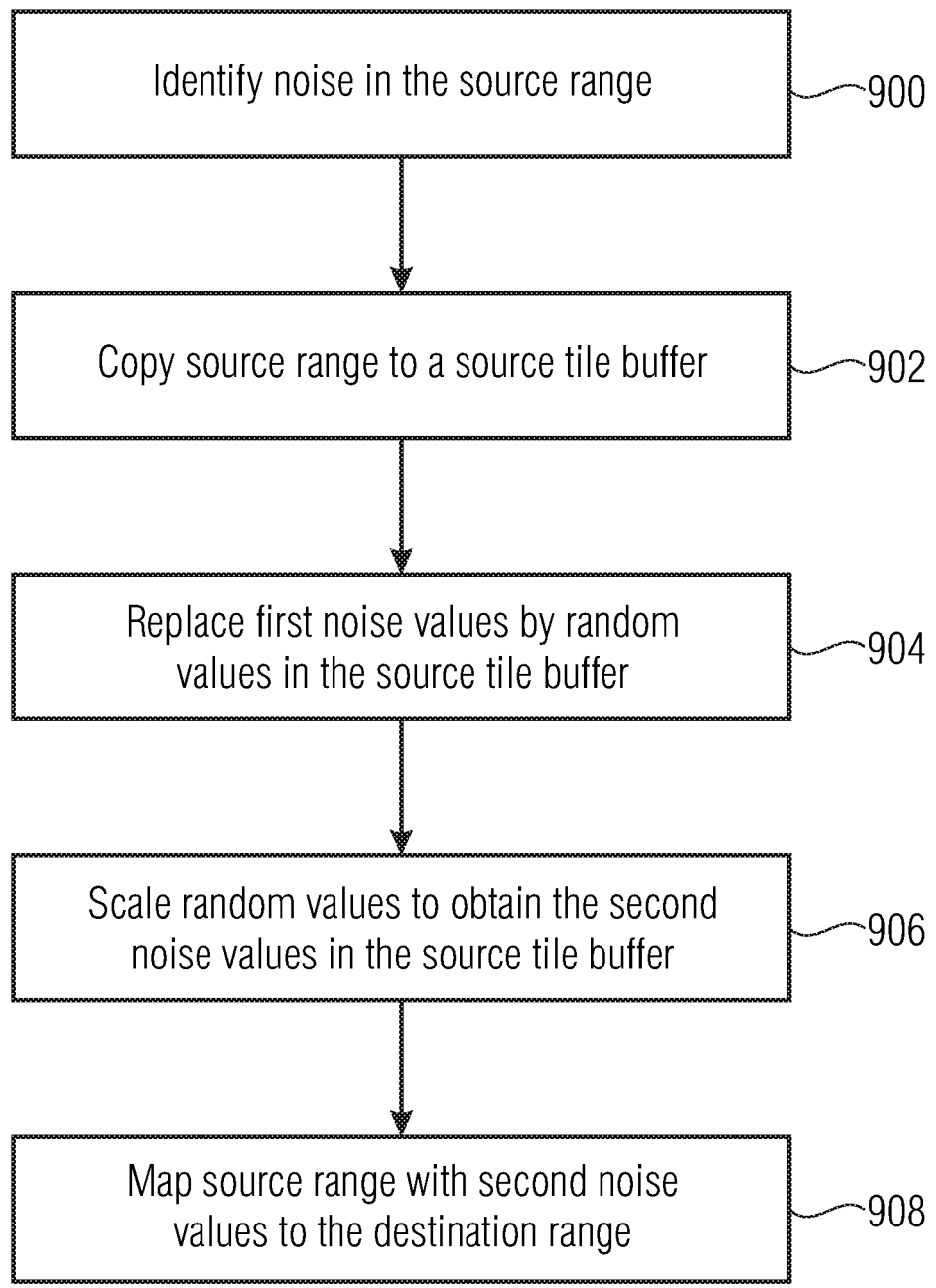
FIG. 9 illustrates a flowchart of a procedure in accordance with a further embodiment of the present invention.
Figure 10:
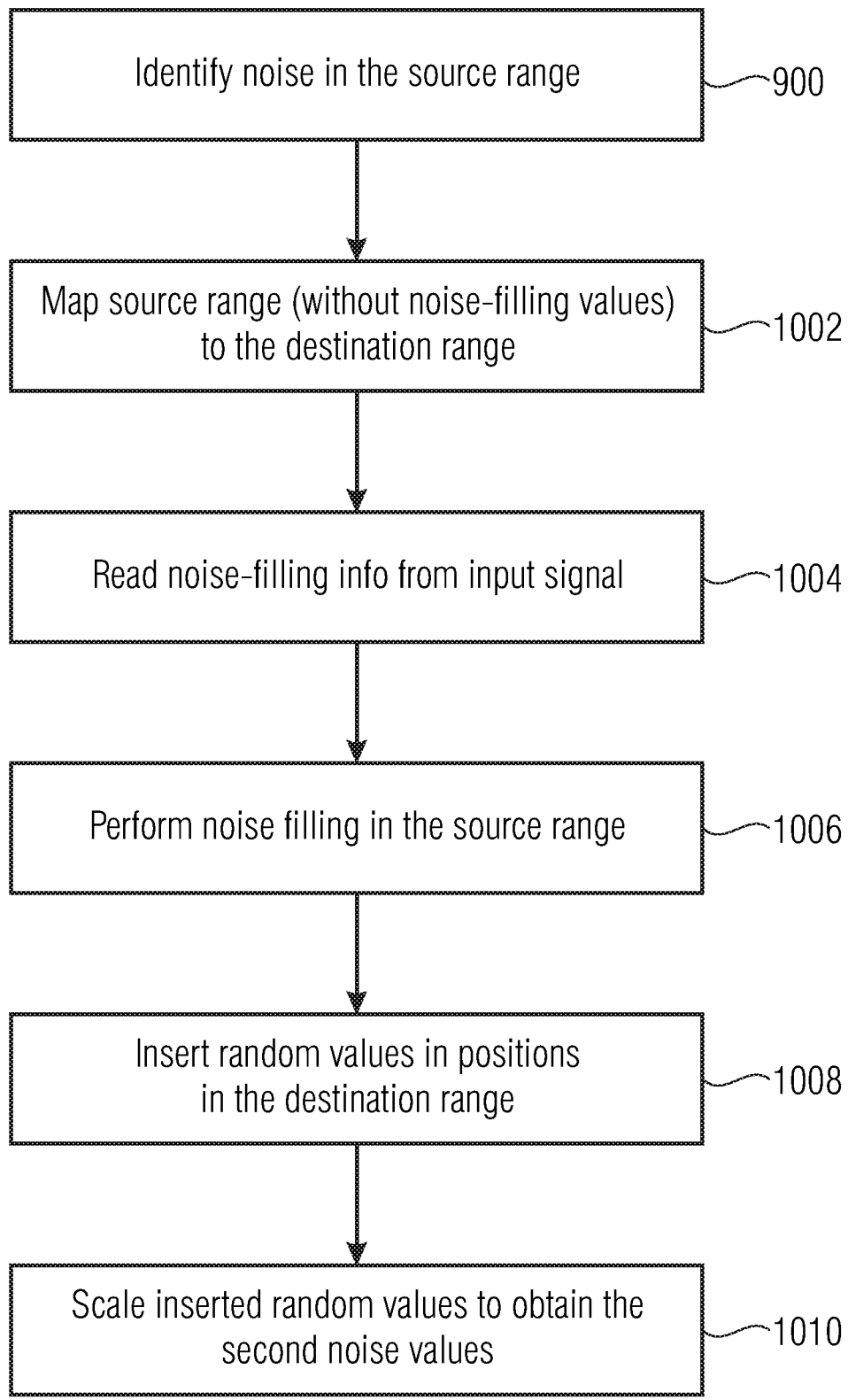
FIG. 10 illustrates a flowchart of a procedure in accordance with a further embodiment of the present invention.

FIG. 10 illustrates a further embodiment of the present invention. Again, in step 900, the noise in the source range is identified. However; the functionality of this step 900 is different from the functionality of the step 900 in FIG. 9, since step 900 in FIG. 9 may operate on an input signal spectrum which has already received noise values, i.e., in which the noise-filling operation has already been performed.

However, in FIG. 10, any noise-filling operation to the input signal has not been performed and the input signal does not yet have any noise values in the noise-filling region at the input in step 902. In step 902, the source range is mapped to the destination or target range where the noise-filling values are not included in the source range.

Thus, the identification of the noise in the source range in step 900 can be, with respect to the noise-filling region, performed by identifying zero spectral values in the signal and/or by using this noise-filling side-information from the input signal, i.e., the encoder-side generated noise-filling information. Then, in step 904, the noise-filling information and, particularly, the energy information identifying the energy to be introduced into the decoder-side input signal is read.

Then, as illustrated in step 1006, a noise-filling in the source range is performed and, subsequently or concurrently, a step 1008 is performed, i.e., random values are inserted in positions in the destination range which have been identified by step 900 over the full band or which have been identified by using the baseband or input signal information together with the mapping information, i.e., which (of a plurality of) source range is mapped to which (of a plurality of) target range.

Finally, the inserted random values are scaled to obtain the second independent or uncorrelated or decorrelated noise values.

Figure 11:
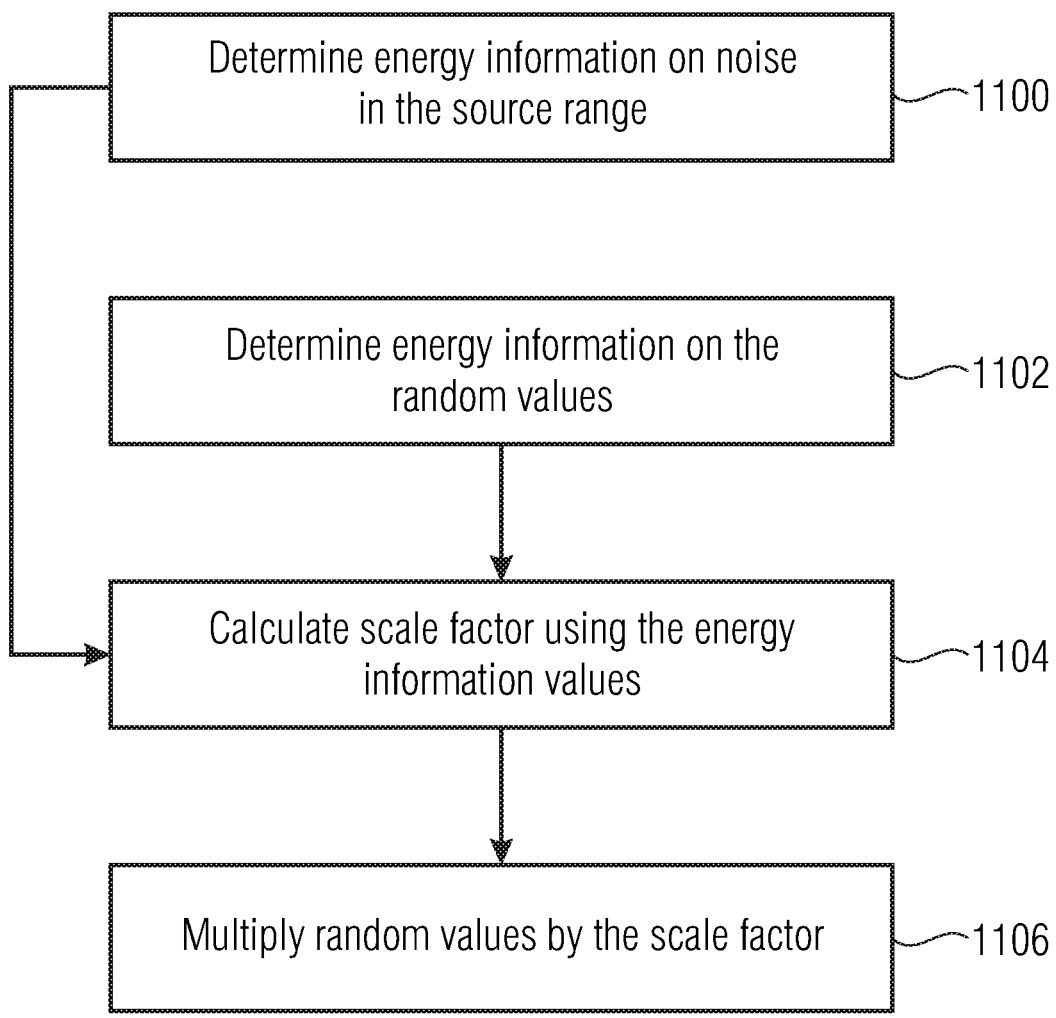
FIG. 11 illustrates a flowchart for explaining a scaling of random values.

Subsequently, FIG. 11 is discussed in order to illustrate further information on the scaling of the noise-filling values in the enhancement spectral region, i.e., how, from the random values, the second noise values are obtained.

In step 1100, an energy information on noise in the source range is obtained. Then, an energy information is determined from the random values, i.e., from the values generated by a random or pseudo-random process as illustrated in step 1102. Furthermore, step 1104 illustrates the way how to calculate the scale factor, i.e., by using the energy information on noise in the source range and by using the energy information on the random values. Then, in step 1106, the random values, i.e., from which the energy has been calculated in step 1102, are multiplied by the scale factor generated by step 1104. Hence, the procedure illustrated in FIG. 11 corresponds to the calculation of the scale factor g illustrated before in an embodiment. However, all these calculations can also be performed in a logarithmic domain or in any other domain and the multiplication step 1106 can be replaced by an addition or subtraction in the logarithmic range.

Figure 12:
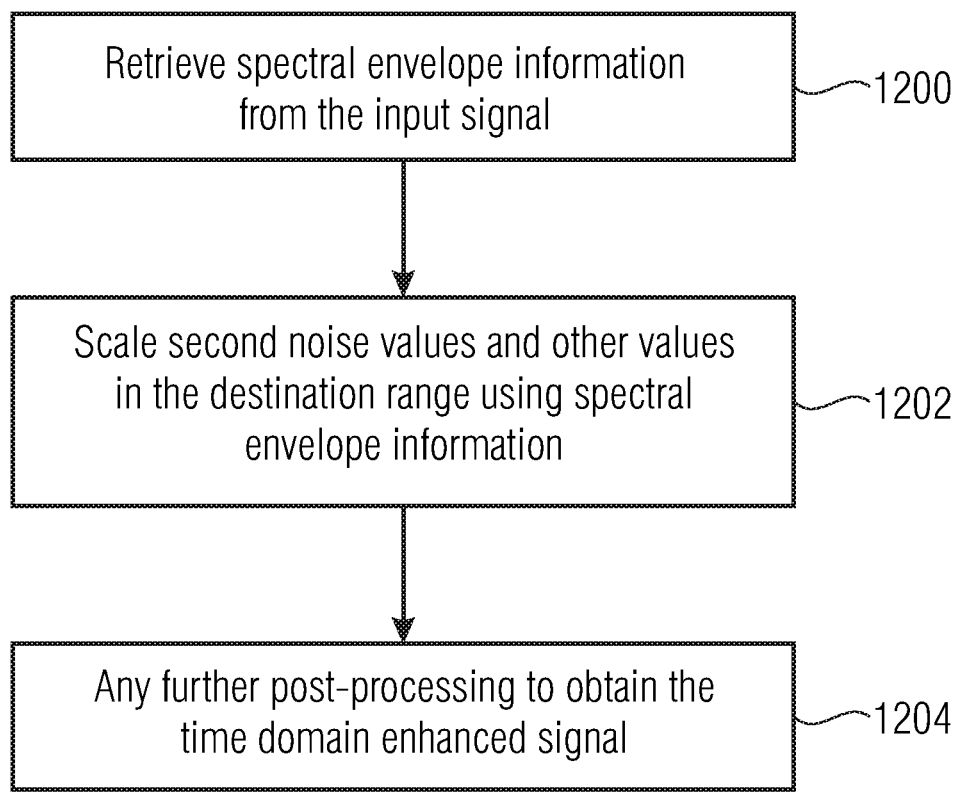
FIG. 12 illustrates a flowchart illustrating an embedding of the present invention into a general bandwidth extension or a gap filling procedure.

Further reference is made to FIG. 12 in order to illustrate the embedding of the present invention within a general intelligent gap filling or bandwidth extension scheme. In step 1200, spectral envelope information is retrieved from the input signal. The spectral envelope information can, for example, be generated by a parameter extractor 1306 of FIG. 13A and can be provided by a parameter decoder 1324 of FIG. 13b. Then, the second noise values and the other values in the destination range are scaled using this spectral envelope information as illustrated in 1202. Subsequently, any further post-processing 1204 can be performed to obtain the final time domain enhanced signal having an increased bandwidth in case of bandwidth extension or having a reduced number or no spectral holes in the context of intelligent gap filling.

In this context, it is outlined that, particularly for the embodiment of FIG. 9, several alternatives can be applied. For an embodiment, step 902 is performed with the whole spectrum of the input signal or at least with the portion of the spectrum of the input signal which is above the noise-filling border frequency. This frequency assures that below a certain frequency, i.e., below this frequency, any noise-filling is not performed at all.

Then, irrespective of any specific source range/target range mapping information, the whole input signal spectrum, i.e., the complete potential source range is copied to the source tile buffer 902 and is then processed with step 904 and 906 and step 908 then selects the certain specifically necessitated source region from this source tile buffer.

In other embodiments, however, only the specifically necessitated source ranges which may be only parts of the input signal are copied to the single source tile buffer or to several individual source tile buffers based on the source range/target range information included in the input signal, i.e., associated as side information to this audio input signal. Depending on the situation, the second alternative, where only the specifically necessitated source ranges are processed by steps 902, 904, 906, the complexity or at least the memory requirements may be reduced compared to the situation where, independent of the specific mapping situation, the whole source range at least above the noise-filling border frequency is processed by steps 902, 904, 906.

Subsequently, reference is made to FIGS. 1a-5e in order to illustrate the specific implementation of the present invention within a frequency regenerator 116, which is placed before the spectrum-time converter 118.

FIG. 1a illustrates an apparatus for encoding an audio signal 99. The audio signal 99 is input into a time spectrum converter 100 for converting an audio signal having a sampling rate into a spectral representation 101 output by the time spectrum converter. The spectrum 101 is input into a spectral analyzer 102 for analyzing the spectral representation 101. The spectral analyzer 101 is configured for determining a first set of first spectral portions 103 to be encoded with a first spectral resolution and a different second set of second spectral portions 105 to be encoded with a second spectral resolution. The second spectral resolution is smaller than the first spectral resolution. The second set of second spectral portions 105 is input into a parameter calculator or parametric coder 104 for calculating spectral envelope information having the second spectral resolution. Furthermore, a spectral domain audio coder 106 is provided for generating a first encoded representation 107 of the first set of first spectral portions having the first spectral resolution. Furthermore, the parameter calculator/parametric coder 104 is configured for generating a second encoded representation 109 of the second set of second spectral portions. The first encoded representation 107 and the second encoded representation 109 are input into a bit stream multiplexer or bit stream former 108 and block 108 finally outputs the encoded audio signal for transmission or storage on a storage device.

Typically, a first spectral portion such as 306 of FIG. 3a will be surrounded by two second spectral portions such as 307a, 307b. This is not the case in HE AAC, where the core coder frequency range is band limited FIG. 1b illustrates a decoder matching with the encoder of FIG. 1a. The first encoded representation 107 is input into a spectral domain audio decoder 112 for generating a first decoded representation of a first set of first spectral portions, the decoded representation having a first spectral resolution. Furthermore, the second encoded representation 109 is input into a parametric decoder 114 for generating a second decoded representation of a second set of second spectral portions having a second spectral resolution being lower than the first spectral resolution.

The decoder further comprises a frequency regenerator 116 for regenerating a reconstructed second spectral portion having the first spectral resolution using a first spectral portion. The frequency regenerator 116 performs a tile filling operation, i.e., uses a tile or portion of the first set of first spectral portions and copies this first set of first spectral portions into the reconstruction range or reconstruction band having the second spectral portion and typically performs spectral envelope shaping or another operation as indicated by the decoded second representation output by the parametric decoder 114, i.e., by using the information on the second set of second spectral portions. The decoded first set of first spectral portions and the reconstructed second set of spectral portions as indicated at the output of the frequency regenerator 116 on line 117 is input into a spectrum-time converter 118 configured for converting the first decoded representation and the reconstructed second spectral portion into a time representation 119, the time representation having a certain high sampling rate.

Figure 2A:
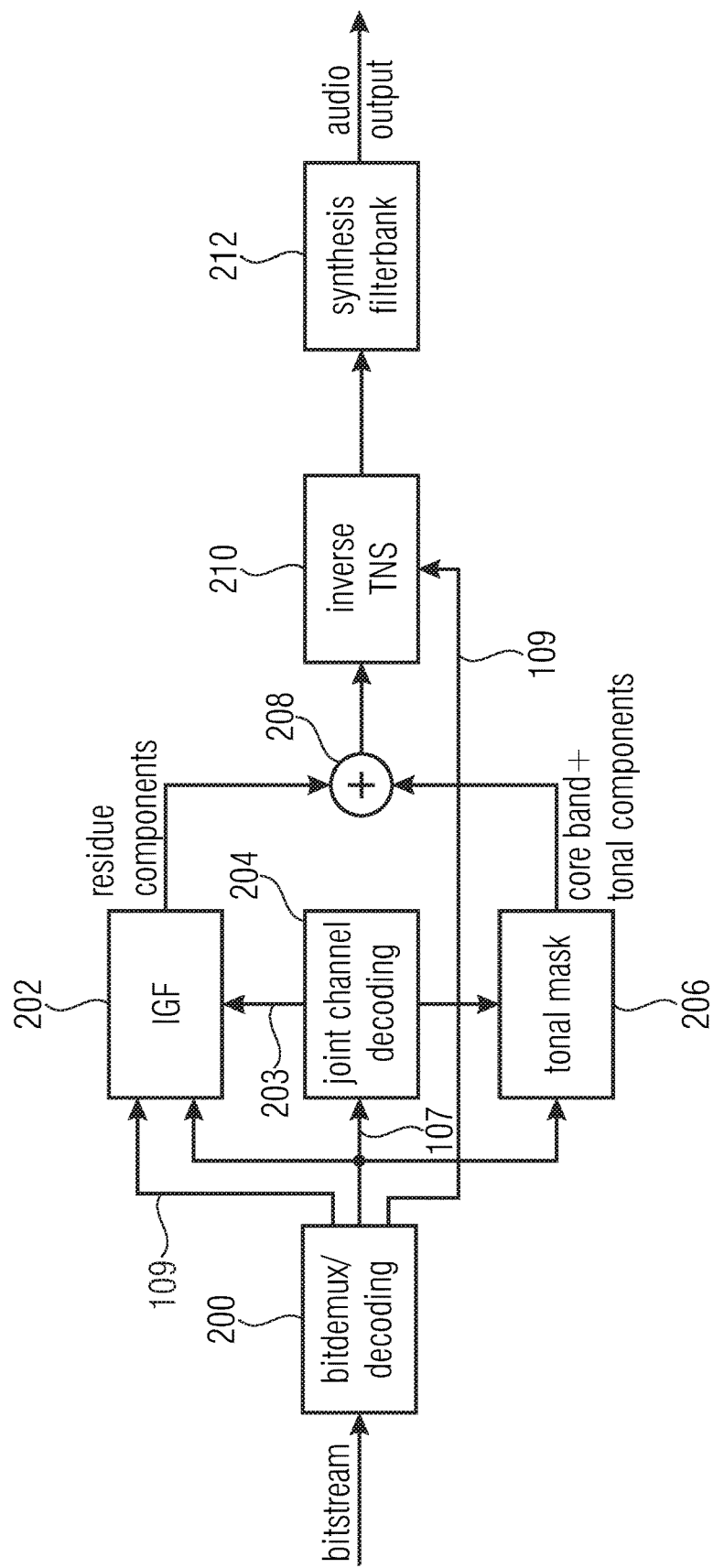
FIG. 2a illustrates an implementation of the decoder.
Figure 2B:
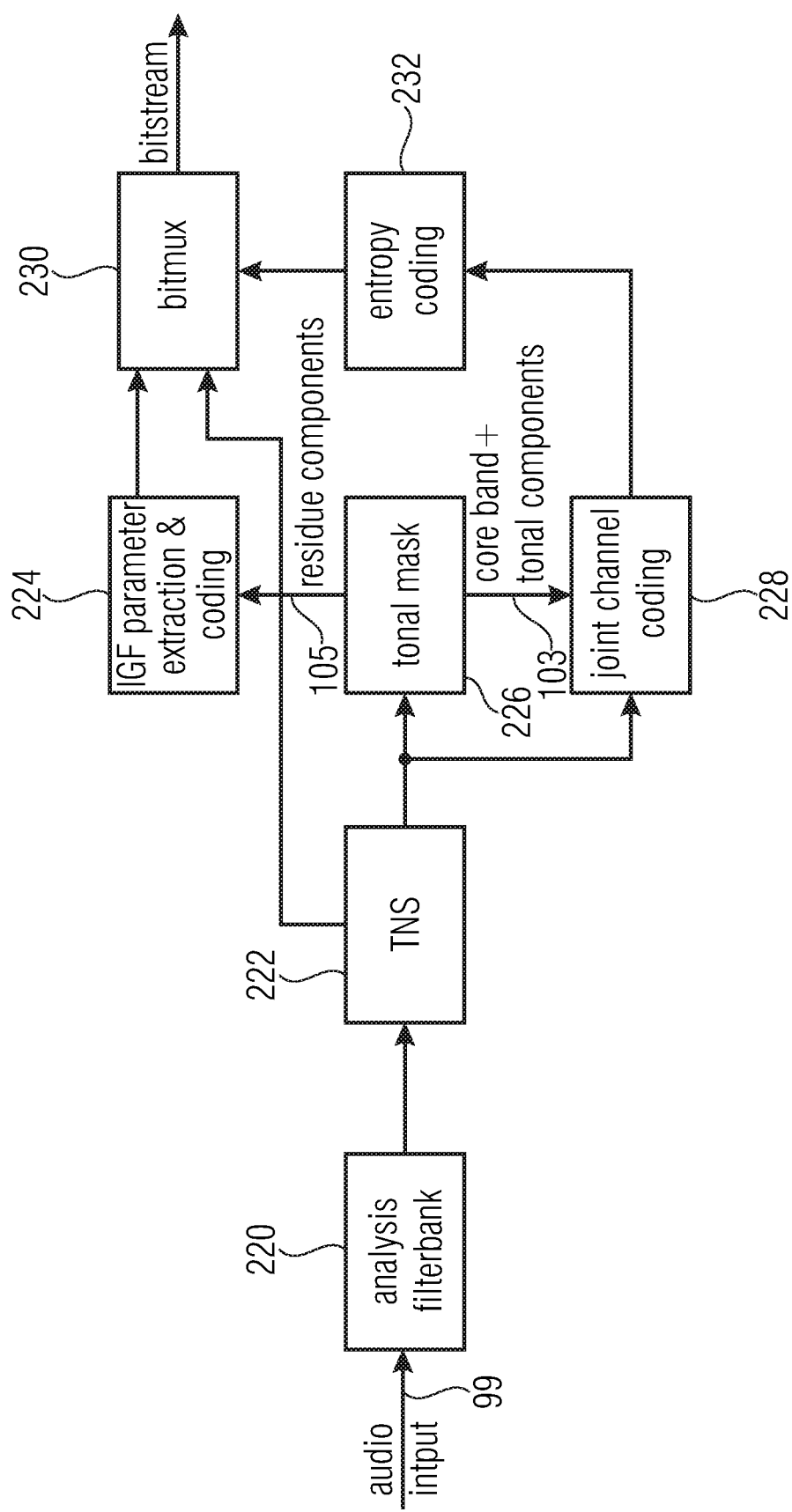
FIG. 2b illustrates an implementation of the encoder.

FIG. 2b illustrates an implementation of the FIG. 1a encoder. An audio input signal 99 is input into an analysis filterbank 220 corresponding to the time spectrum converter 100 of FIG. 1a. Then, a temporal noise shaping operation is performed in TNS block 222. Therefore, the input into the spectral analyzer 102 of FIG. 1a corresponding to a block tonal mask 226 of FIG. 2b can either be full spectral values, when the temporal noise shaping/temporal tile shaping operation is not applied or can be spectral residual values, when the TNS operation as illustrated in FIG. 2b, block 222 is applied. For two-channel signals or multi-channel signals, a joint channel coding 228 can additionally be performed, so that the spectral domain encoder 106 of FIG. 1a may comprise the joint channel coding block 228. Furthermore, an entropy coder 232 for performing a lossless data compression is provided which is also a portion of the spectral domain encoder 106 of FIG. 1a.

The spectral analyzer/tonal mask 226 separates the output of TNS block 222 into the core band and the tonal components corresponding to the first set of first spectral portions 103 and the residual components corresponding to the second set of second spectral portions 105 of FIG. 1a. The block 224 indicated as IGF parameter extraction encoding corresponds to the parametric coder 104 of FIG. 1a and the bitstream multiplexer 230 corresponds to the bitstream multiplexer 108 of FIG. 1a.

The analysis filterbank 222 is implemented as an MDCT (modified discrete cosine transform filterbank) and the MDCT is used to transform the signal 99 into a time-frequency domain with the modified discrete cosine transform acting as the frequency analysis tool.

The spectral analyzer 226 applies a tonality mask. This tonality mask estimation stage is used to separate tonal components from the noise-like components in the signal. This allows the core coder 228 to code all tonal components with a psycho-acoustic module. The tonality mask estimation stage can be implemented in numerous different ways and is implemented similar in its functionality to the sinusoidal track estimation stage used in sine and noise-modeling for speech/audio coding [8, 9] or an HILN model based audio coder described in [10]. An implementation is used which is easy to implement without the need to maintain birth-death trajectories, but any other tonality or noise detector can be used as well.

The IGF module calculates the similarity that exists between a source region and a target region. The target region will be represented by the spectrum from the source region. The measure of similarity between the source and target regions is done using a cross-correlation approach. The target region is split into nTar non-overlapping frequency tiles. For every tile in the target region, nSrc source tiles are created from a fixed start frequency. These source tiles overlap by a factor between 0 and 1, where 0 means 0% overlap and 1 means 100% overlap. Each of these source tiles is correlated with the target tile at various lags to find the source tile that best matches the target tile. The best matching tile number is stored in titleNum[tdx_tar], the lag at which it best correlates with the target is stored in xcorr_tag[tdx_tar][tdx_src] and the sign of the correlation is stored in xcorr_stgn[tdx_tar][tdx_src]. In case the correlation is highly negative, the source tile needs to be multiplied by −1 before the tile filling process at the decoder. The IGF module also takes care of not overwriting the tonal components in the spectrum since the tonal components are preserved using the tonality mask. A band-wise energy parameter is used to store the energy of the target region enabling us to reconstruct the spectrum accurately.

This method has certain advantages over the classical SBR [1] in that the harmonic grid of a multi-tone signal is preserved by the core coder while only the gaps between the sinusoids is filled with the best matching "shaped noise" from the source region. Another advantage of this system compared to ASR (Accurate Spectral Replacement) [2-4] is the absence of a signal synthesis stage which creates the important portions of the signal at the decoder. Instead, this task is taken over by the core coder, enabling the preservation of important components of the spectrum. Another advantage of the proposed system is the continuous scalability that the features offer. Just using titleNum[tdx_tar] and xcorr_lag=0, for every tile is called gross granularity matching and can be used for low bitrates while using variable xcorr_lag for every tile enables us to match the target and source spectra better.

In addition, a tile choice stabilization technique is proposed which removes frequency domain artifacts such as trilling and musical noise.

In case of stereo channel pairs an additional joint stereo processing is applied. This is necessitated, because for a certain destination range the signal can a highly correlated panned sound source. In case the source regions chosen for this particular region are not well correlated, although the energies are matched for the destination regions, the spatial image can suffer due to the uncorrelated source regions. The encoder analyses each destination region energy band, typically performing a cross-correlation of the spectral values and if a certain threshold is exceeded, sets a joint flag for this energy band. In the decoder the left and right channel energy bands are treated individually if this joint stereo flag is not set. In case the joint stereo flag is set, both the energies and the patching are performed in the joint stereo domain. The joint stereo information for the IGF regions is signaled similar the joint stereo information for the core coding, including a flag indicating in case of prediction if the direction of the prediction is from downmix to residual or vice versa.

The energies can be calculated from the transmitted energies in the L/R-domain.
midNrg[k]=leftNrg[k]+rightNrg[k],
sideNrg[k]=leftNrg[k]−rightNrg[k],
with k being the frequency index in the transform domain.

Another solution is to calculate and transmit the energies directly in the joint stereo domain for bands where joint stereo is active, so no additional energy transformation is needed at the decoder side.

The source tiles are created according to the Mid/Side-Matrix:
midTile[k]=0.5·(leftTile[k]+rightTile[k])
sideTile[k]=0.5·(leftTile[k]−rightTile[k])
Energy Adjustment:
midTile[k]=midTile[k]*midNrg[k],
sideTile[k]=sideTile[k]*sideNrg[k], Joint stereo->LR transformation:
If no additional prediction parameter is coded:
leftTile[k]=midTile[k]+sideTile[k]
rightTile[k]=midTile[k]−sideTile[k]
If an additional prediction parameter is coded and if the signaled direction is from mid to side:
sideTile[k]=sideTile[k]−predictionCoeff·midTile[k]
leftTile[k]=midTile[k]+sideTile[k]
rightTile[k]=midTile[k]−sideTile[k]
If the signaled direction is from side to mid:
midTile1[k]=midTile[k]−predictionCoeff·sideTile[k]
leftTile[k]=midTile1[k]−sideTile[k]
rightTile[k]=midTile1[k]+sideTile[k]

This processing ensures that from the tiles used for regenerating highly correlated destination regions and panned destination regions, the resulting left and right channels still represent a correlated and panned sound source even if the source regions are not correlated, preserving the stereo image for such regions.

In other words, in the bitstream, joint stereo flags are transmitted that indicate whether L/R or M/S as an example for the general joint stereo coding shall be used. In the decoder, first, the core signal is decoded as indicated by the joint stereo flags for the core bands. Second, the core signal is stored in both L/R and M/S representation. For the IGF tile filling, the source tile representation is chosen to fit the target tile representation as indicated by the joint stereo information for the IGF bands.

Temporal Noise Shaping (TNS) is a standard technique and part of AAC [11-13]. TNS can be considered as an extension of the basic scheme of a perceptual coder, inserting an optional processing step between the filterbank and the quantization stage. The main task of the TNS module is to hide the produced quantization noise in the temporal masking region of transient like signals and thus it leads to a more efficient coding scheme. First, TNS calculates a set of prediction coefficients using "forward prediction" in the transform domain, e.g. MDCT. These coefficients are then used for flattening the temporal envelope of the signal. As the quantization affects the TNS filtered spectrum, also the quantization noise is temporarily flat. By applying the invers TNS filtering on decoder side, the quantization noise is shaped according to the temporal envelope of the TNS filter and therefore the quantization noise gets masked by the transient.

IGF is based on an MDCT representation. For efficient coding, long blocks of approx. 20 ms have to be used. If the signal within such a long block contains transients, audible pre- and post-echoes occur in the IGF spectral bands due to the tile filling. FIG. 7c shows a typical pre-echo effect before the transient onset due to IGF. On the left side, the spectrogram of the original signal is shown and on the right side the spectrogram of the bandwidth extended signal without TNS filtering is shown.

This pre-echo effect is reduced by using TNS in the IGF context. Here, TNS is used as a temporal tile shaping (TTS) tool as the spectral regeneration in the decoder is performed on the TNS residual signal. The necessitated TTS prediction coefficients are calculated and applied using the full spectrum on encoder side as usual. The TNS/TTS start and stop frequencies are not affected by the IGF start frequency $f_{IGFstore}$ of the IGF tool. In comparison to the legacy TNS, the TTS stop frequency is increased to the stop frequency of the IGF tool, which is higher than $f_{IGFstore}$. On decoder side the TNS/TTS coefficients are applied on the full spectrum again, i.e. the core spectrum plus the regenerated spectrum plus the tonal components from the tonality map (see FIG. 7e). The application of TTS is necessitated to form the temporal envelope of the regenerated spectrum to match the envelope of the original signal again. So the shown pre-echoes are reduced. In addition, it still shapes the quantization noise in the signal below $f_{IGFstore}$ as usual with TNS.

In legacy decoders, spectral patching on an audio signal corrupts spectral correlation at the patch borders and thereby impairs the temporal envelope of the audio signal by introducing dispersion. Hence, another benefit of performing the IGF tile filling on the residual signal is that, after application of the shaping filter, tile borders are seamlessly correlated, resulting in a more faithful temporal reproduction of the signal.

In an inventive encoder, the spectrum having undergone TNS/TTS filtering, tonality mask processing and IGF parameter estimation is devoid of any signal above the IGF start frequency except for tonal components. This sparse spectrum is now coded by the core coder using principles of arithmetic coding and predictive coding. These coded components along with the signaling bits form the bitstream of the audio.

FIG. 2a illustrates the corresponding decoder implementation. The bitstream in FIG. 2a corresponding to the encoded audio signal is input into the demultiplexer/decoder which would be connected, with respect to FIG. 1b, to the blocks 112 and 114. The bitstream demultiplexer separates the input audio signal into the first encoded representation 107 of FIG. 1b and the second encoded representation 109 of FIG. 1b. The first encoded representation having the first set of first spectral portions is input into the joint channel decoding block 204 corresponding to the spectral domain decoder 112 of FIG. 1b. The second encoded representation is input into the parametric decoder 114 not illustrated in FIG. 2a and then input into the IGF block 202 corresponding to the frequency regenerator 116 of FIG. 1b. The first set of first spectral portions necessitated for frequency regeneration are input into IGF block 202 via line 203. Furthermore, subsequent to joint channel decoding 204 the specific core decoding is applied in the tonal mask block 206 so that the output of tonal mask 206 corresponds to the output of the spectral domain decoder 112. Then, a combination by combiner 208 is performed, i.e., a frame building where the output of combiner 208 now has the full range spectrum, but still in the TNS/TTS filtered domain. Then, in block 210, an inverse TNS/TTS operation is performed using TNS/TTS filter information provided via line 109, i.e., the TTS side information is included in the first encoded representation generated by the spectral domain encoder 106 which can, for example, be a straightforward AAC or USAC core encoder, or can also be included in the second encoded representation. At the output of block 210, a complete spectrum until the maximum frequency is provided which is the full range frequency defined by the sampling rate of the original input signal. Then, a spectrum/time conversion is performed in the synthesis filterbank 212 to finally obtain the audio output signal.

FIG. 3a illustrates a schematic representation of the spectrum. The spectrum is subdivided in scale factor bands SCB where there are seven scale factor bands SCB1 to SCB7 in the illustrated example of FIG. 3a. The scale factor bands can be AAC scale factor bands which are defined in the AAC standard and have an increasing bandwidth to upper frequencies as illustrated in FIG. 3a schematically. It is advantageous to perform intelligent gap filling not from the very beginning of the spectrum, i.e., at low frequencies, but to start the IGF operation at an IGF start frequency illustrated at 309. Therefore, the core frequency band extends from the lowest frequency to the IGF start frequency. Above the IGF start frequency, the spectrum analysis is applied to separate high resolution spectral components 304, 305, 306, 307 (the first set of first spectral portions) from low resolution components represented by the second set of second spectral portions. FIG. 3a illustrates a spectrum which is exemplarily input into the spectral domain encoder 106 or the joint channel coder 228, i.e., the core encoder operates in the full range, but encodes a significant amount of zero spectral values, i.e., these zero spectral values are quantized to zero or are set to zero before quantizing or subsequent to quantizing. Anyway, the core encoder operates in full range, i.e., as if the spectrum would be as illustrated, i.e., the core decoder does not necessarily have to be aware of any intelligent gap filling or encoding of the second set of second spectral portions with a lower spectral resolution.

The high resolution is defined by a line-wise coding of spectral lines such as MDCT lines, while the second resolution or low resolution is defined by, for example, calculating only a single spectral value per scale factor band, where a scale factor band covers several frequency lines. Thus, the second low resolution is, with respect to its spectral resolution, much lower than the first or high resolution defined by the line-wise coding typically applied by the core encoder such as an AAC or USAC core encoder.

Regarding scale factor or energy calculation, the situation is illustrated in FIG. 3b. Due to the fact that the encoder is a core encoder and due to the fact that there can, but does not necessarily have to be, components of the first set of spectral portions in each band, the core encoder calculates a scale factor for each band not only in the core range below the IGF start frequency 309, but also above the IGF start frequency until the maximum frequency $f_{IGFstore}$ which is smaller or equal to the half of the sampling frequency, i.e., $f_{s/2}$. Thus, the encoded tonal portions 302, 304, 305, 306, 307 of FIG. 3a and, in this embodiment together with the scale factors SCB1 to SCB7 correspond to the high resolution spectral data. The low resolution spectral data are calculated starting from the IGF start frequency and correspond to the energy information values $E_1$, $E_2$, $E_3$, $E_4$, which are transmitted together with the scale factors SF4 to SF7.

Particularly, when the core encoder is under a low bitrate condition, an additional noise-filling operation in the core band, i.e., lower in frequency than the IGF start frequency, i.e., in scale factor bands SCB1 to SCB3 can be applied in addition. In noise-filling, there exist several adjacent spectral lines which have been quantized to zero. On the decoder-side, these quantized to zero spectral values are re-synthesized and the re-synthesized spectral values are adjusted in their magnitude using a noise-filling energy such as $NF_2$ illustrated at 308 in FIG. 3b. The noise-filling energy, which can be given in absolute terms or in relative terms particularly with respect to the scale factor as in USAC corresponds to the energy of the set of spectral values quantized to zero. These noise-filling spectral lines can also be considered to be a third set of third spectral portions which are regenerated by straightforward noise-filling synthesis without any IGF operation relying on frequency regeneration using frequency tiles from other frequencies for reconstructing frequency tiles using spectral values from a source range and the energy information $E_1$, $E_2$, $E_3$, $E_4$.

The bands, for which energy information is calculated coincide with the scale factor bands. In other embodiments, an energy information value grouping is applied so that, for example, for scale factor bands 4 and 5, only a single energy information value is transmitted, but even in this embodiment, the borders of the grouped reconstruction bands coincide with borders of the scale factor bands. If different band separations are applied, then certain re-calculations or synchronization calculations may be applied, and this can make sense depending on the certain implementation.

Figure 4A:
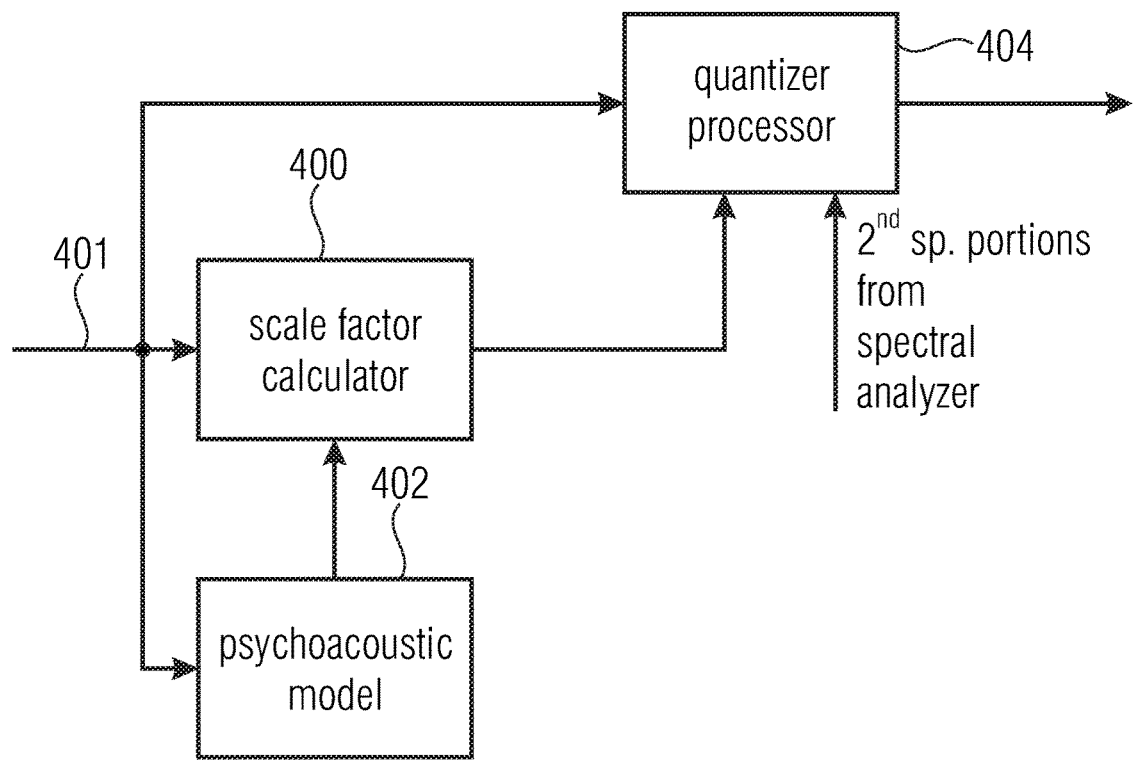
FIG. 4a illustrates the functionality of the spectral domain encoder for applying the selection of spectral portions into the first and second sets of spectral portions.

The spectral domain encoder 106 of FIG. 1a is a psycho-acoustically driven encoder as illustrated in FIG. 4a. Typically, as for example illustrated in the MPEG2/4 AAC standard or MPEG1/2, Layer 3 standard, the to be encoded audio signal after having been transformed into the spectral range (401 in FIG. 4a) is forwarded to a scale factor calculator 400. The scale factor calculator is controlled by a psycho-acoustic model additionally receiving the to be quantized audio signal or receiving, as in the MPEG1/2 Layer 3 or MPEG AAC standard, a complex spectral representation of the audio signal. The psycho-acoustic model calculates, for each scale factor band, a scale factor representing the psycho-acoustic threshold. Additionally, the scale factors are then, by cooperation of the well-known inner and outer iteration loops or by any other suitable encoding procedure adjusted so that certain bitrate conditions are fulfilled. Then, the to be quantized spectral values on the one hand and the calculated scale factors on the other hand are input into a quantizer processor 404. In the straightforward audio encoder operation, the to be quantized spectral values are weighted by the scale factors and, the weighted spectral values are then input into a fixed quantizer typically having a compression functionality to upper amplitude ranges. Then, at the output of the quantizer processor there do exist quantization indices which are then forwarded into an entropy encoder typically having specific and very efficient coding for a set of zero-quantization indices for adjacent frequency values or, as also called in the art, a "run" of zero values.

In the audio encoder of FIG. 1a, however, the quantizer processor typically receives information on the second spectral portions from the spectral analyzer. Thus, the quantizer processor 404 makes sure that, in the output of the quantizer processor 404, the second spectral portions as identified by the spectral analyzer 102 are zero or have a representation acknowledged by an encoder or a decoder as a zero representation which can be very efficiently coded, specifically when there exist "runs" of zero values in the spectrum.

Figure 4B:
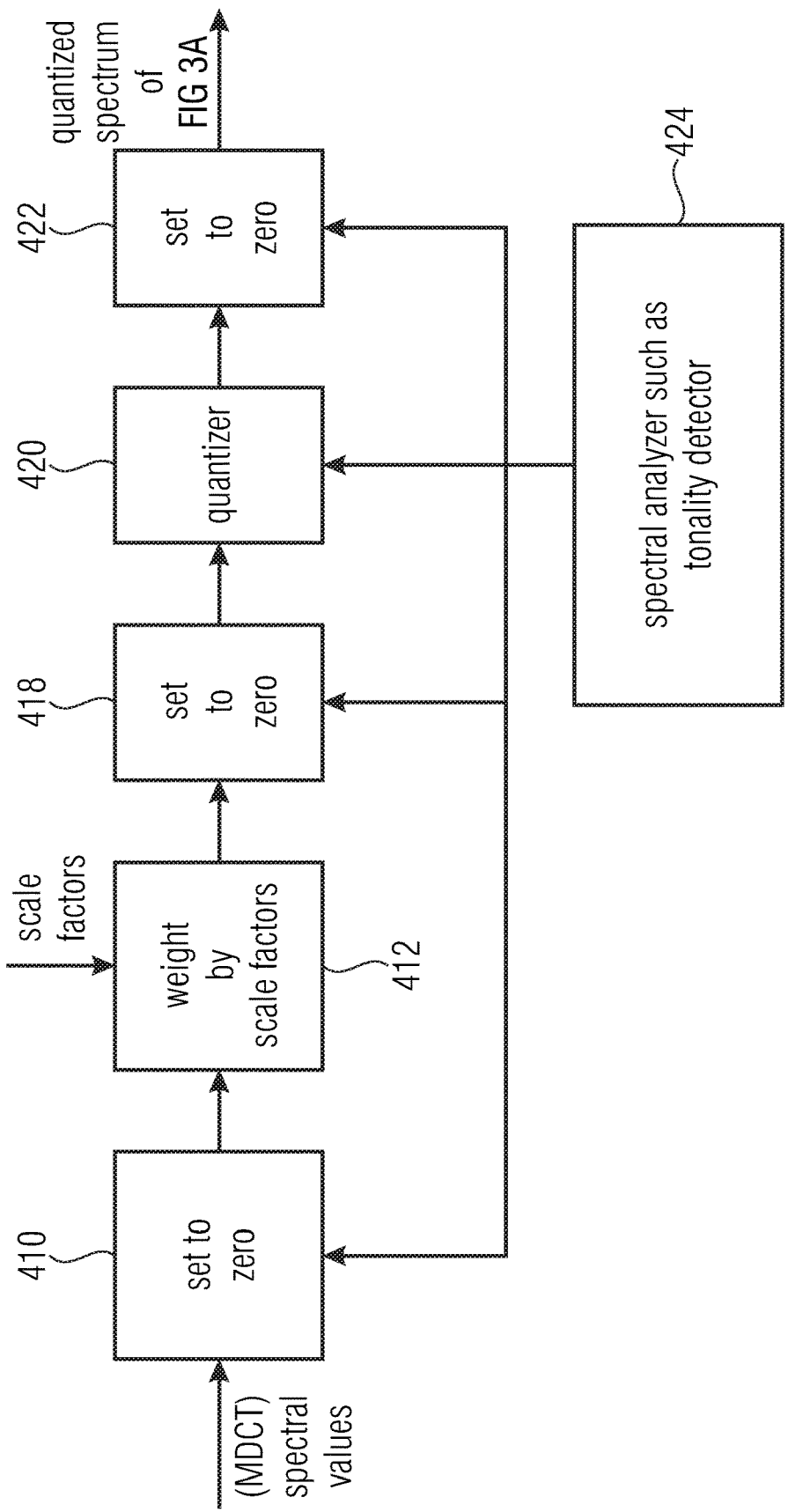

FIG. 4b illustrates an implementation of the quantizer processor. The MDCT spectral values can be input into a set to zero block 410. Then, the second spectral portions are already set to zero before a weighting by the scale factors in block 412 is performed. In an additional implementation, block 410 is not provided, but the set to zero cooperation is performed in block 418 subsequent to the weighting block 412. In an even further implementation, the set to zero operation can also be performed in a set to zero block 422 subsequent to a quantization in the quantizer block 420. In this implementation, blocks 410 and 418 would not be present. Generally, at least one of the blocks 410, 418, 422 are provided depending on the specific implementation.

Then, at the output of block 422, a quantized spectrum is obtained corresponding to what is illustrated in FIG. 3a. This quantized spectrum is then input into an entropy coder such as 232 in FIG. 2b which can be a Huffman coder or an arithmetic coder as, for example, defined in the USAC standard.

The set to zero blocks 410, 418, 422, which are provided alternatively to each other or in parallel are controlled by the spectral analyzer 424. The spectral analyzer comprises any implementation of a well-known tonality detector or comprises any different kind of detector operative for separating a spectrum into components to be encoded with a high resolution and components to be encoded with a low resolution. Other such algorithms implemented in the spectral analyzer can be a voice activity detector, a noise detector, a speech detector or any other detector deciding, depending on spectral information or associated metadata on the resolution requirements for different spectral portions.

Figure 5A:
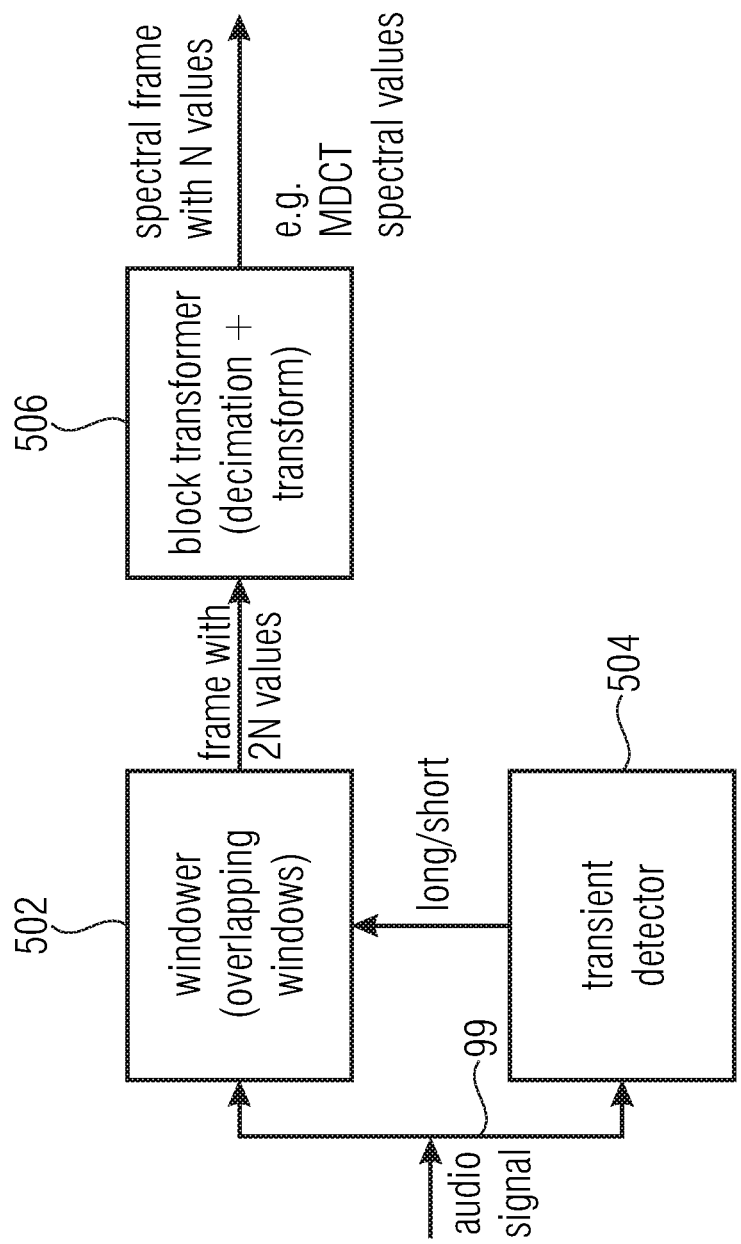
FIG. 5a illustrates a functionality of an MDCT encoder.

FIG. 5a illustrates an implementation of the time spectrum converter 100 of FIG. 1a as, for example, implemented in AAC or USAC. The time spectrum converter 100 comprises a windower 502 controlled by a transient detector 504. When the transient detector 504 detects a transient, then a switchover from long windows to short windows is signaled to the windower. The windower 502 then calculates, for overlapping blocks, windowed frames, where each windowed frame typically has two N values such as 2048 values. Then, a transformation within a block transformer 506 is performed, and this block transformer typically additionally provides a decimation, so that a combined decimation/transform is performed to obtain a spectral frame with N values such as MDCT spectral values. Thus, for a long window operation, the frame at the input of block 506 comprises two N values such as 2048 values and a spectral frame then has 1024 values. Then, however, a switch is performed to short blocks, when eight short blocks are performed where each short block has ⅛ windowed time domain values compared to a long window and each spectral block has ⅛ spectral values compared to a long block. Thus, when this decimation is combined with a 50% overlap operation of the windower, the spectrum is a critically sampled version of the time domain audio signal 99.

Figure 5B:
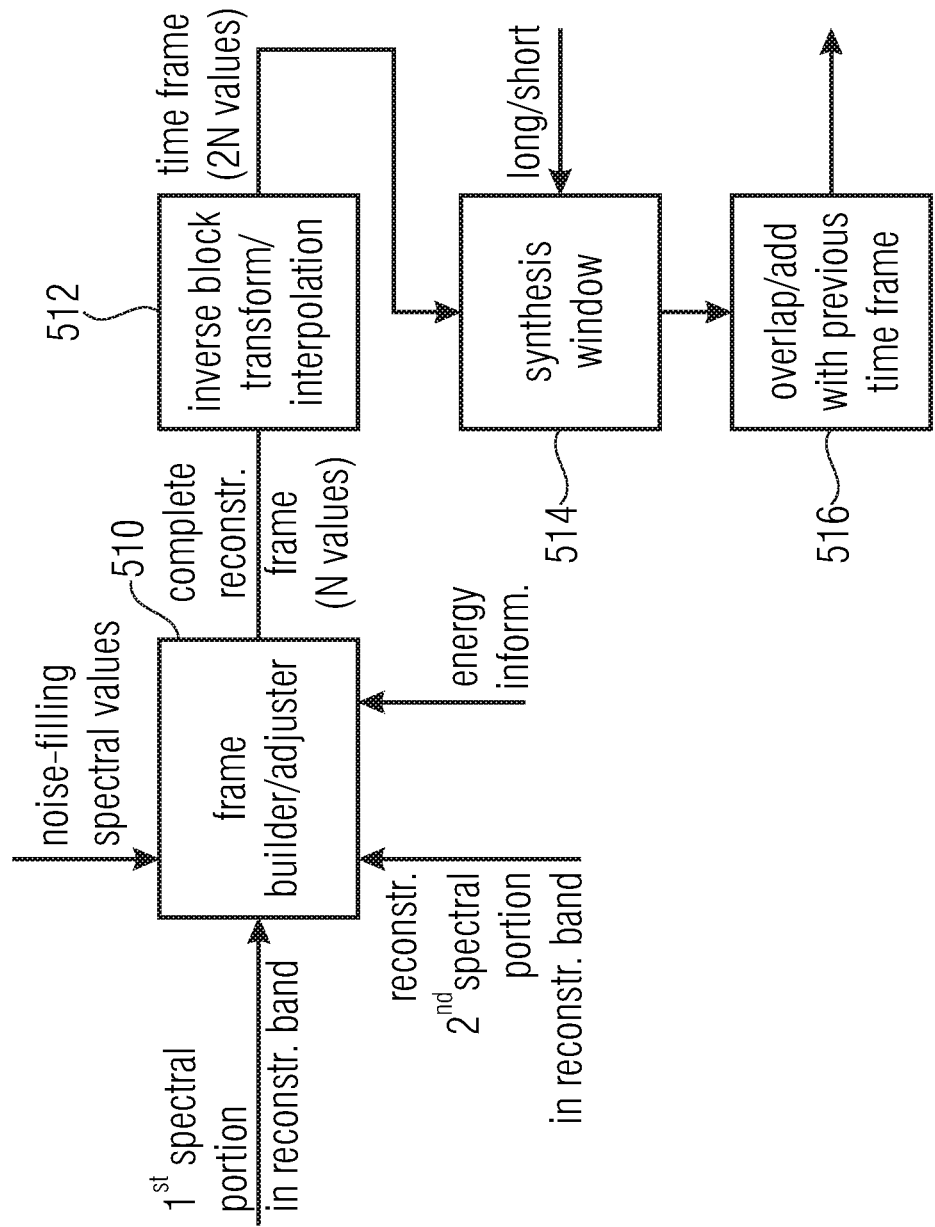
FIG. 5b illustrates a functionality of the decoder with an MDCT technology.

Subsequently, reference is made to FIG. 5b illustrating a specific implementation of frequency regenerator 116 and the spectrum-time converter 118 of FIG. 1b, or of the combined operation of blocks 208, 212 of FIG. 2a. In FIG. 5b, a specific reconstruction band is considered such as scale factor band 6 of FIG. 3a. The first spectral portion in this reconstruction band, i.e., the first spectral portion 306 of FIG. 3a is input into the frame builder/adjustor block 510. Furthermore, a reconstructed second spectral portion for the scale factor band 6 is input into the frame builder/adjuster 510 as well. Furthermore, energy information such as $E_3$ of FIG. 3b for a scale factor band 6 is also input into block 510. The reconstructed second spectral portion in the reconstruction band has already been generated by frequency tile filling using a source range and the reconstruction band then corresponds to the target range. Now, an energy adjustment of the frame is performed to then finally obtain the complete reconstructed frame having the N values as, for example, obtained at the output of combiner 208 of FIG. 2a. Then, in block 512, an inverse block transform/interpolation is performed to obtain 248 time domain values for the for example 124 spectral values at the input of block 512. Then, a synthesis windowing operation is performed in block 514 which is again controlled by a long window/short window indication transmitted as side information in the encoded audio signal. Then, in block 516, an overlap/add operation with a previous time frame is performed. MDCT applies a 50% overlap so that, for each new time frame of 2N values, N time domain values are finally output. A 50% overlap is heavily advantageous due to the fact that it provides critical sampling and a continuous crossover from one frame to the next frame due to the overlap/add operation in block 516.

As illustrated at 301 in FIG. 3a, a noise-filling operation can additionally be applied not only below the IGF start frequency, but also above the IGF start frequency such as for the contemplated reconstruction band coinciding with scale factor band 6 of FIG. 3a. Then, noise-filling spectral values can also be input into the frame builder/adjuster 510 and the adjustment of the noise-filling spectral values can also be applied within this block or the noise-filling spectral values can already be adjusted using the noise-filling energy before being input into the frame builder/adjuster 510.

An IGF operation, i.e., a frequency tile filling operation using spectral values from other portions can be applied in the complete spectrum. Thus, a spectral tile filling operation can not only be applied in the high band above an IGF start frequency but can also be applied in the low band. Furthermore, the noise-filling without frequency tile filling can also be applied not only below the IGF start frequency but also above the IGF start frequency. It has, however, been found that high quality and high efficient audio encoding can be obtained when the noise-filling operation is limited to the frequency range below the IGF start frequency and when the frequency tile filling operation is restricted to the frequency range above the IGF start frequency as illustrated in FIG. 3a.

The target tiles (TT) (having frequencies greater than the IGF start frequency) are bound to scale factor band borders of the full rate coder. Source tiles (ST), from which information is taken, i.e., for frequencies lower than the IGF start frequency are not bound by scale factor band borders. The size of the ST should correspond to the size of the associated TT. This is illustrated using the following example. TT[0] has a length of 10 MDCT Bins. This exactly corresponds to the length of two subsequent SCBs (such as 4+6). Then, all possible ST that are to be correlated with TT[0], have a length of 10 bins, too. A second target tile TT[1] being adjacent to TT[0] has a length of 15 bins I (SCB having a length of 7+8). Then, the ST for that have a length of 15 bins rather than 10 bins as for TT[0].

Should the case arise that one cannot find a TT for an ST with the length of the target tile (when e.g. the length of TT is greater than the available source range), then a correlation is not calculated and the source range is copied a number of times into this TT (the copying is done one after the other so that a frequency line for the lowest frequency of the second copy immediately follows—in frequency—the frequency line for the highest frequency of the first copy), until the target tile TT is completely filled up.

Figure 5C:
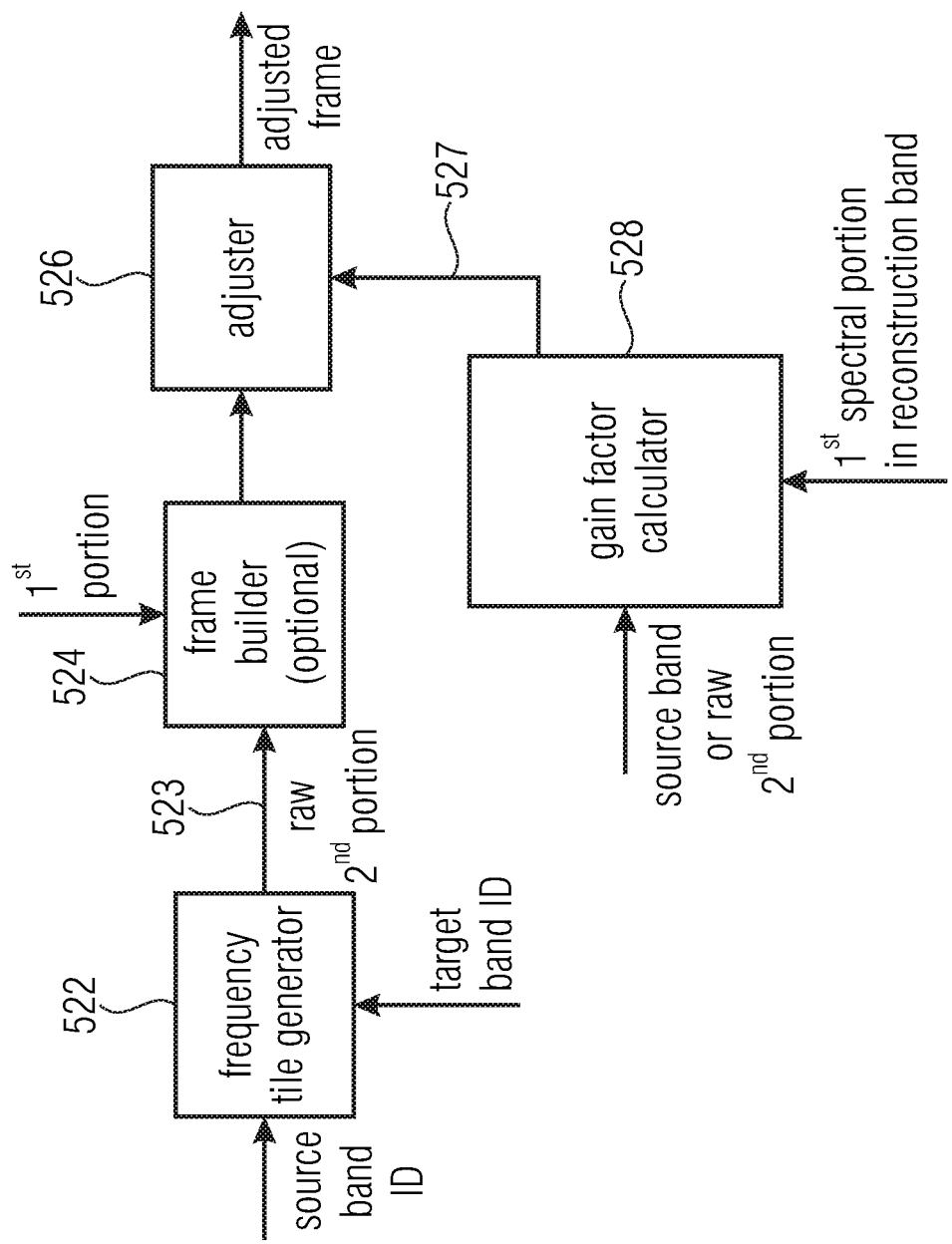
FIG. 5c illustrates an implementation of the frequency regenerator.

Subsequently, reference is made to FIG. 5c illustrating a further embodiment of the frequency regenerator 116 of FIG. 1b or the IGF block 202 of FIG. 2a. Block 522 is a frequency tile generator receiving, not only a target band ID, but additionally receiving a source band ID. Exemplarily, it has been determined on the encoder-side that the scale factor band 3 of FIG. 3a is very well suited for reconstructing scale factor band 7. Thus, the source band ID would be 2 and the target band ID would be 7. Based on this information, the frequency tile generator 522 applies a copy up or harmonic tile filling operation or any other tile filling operation to generate the raw second portion of spectral components 523. The raw second portion of spectral components has a frequency resolution identical to the frequency resolution included in the first set of first spectral portions.

Then, the first spectral portion of the reconstruction band such as 307 of FIG. 3a is input into a frame builder 524 and the raw second portion 523 is also input into the frame builder 524. Then, the reconstructed frame is adjusted by the adjuster 526 using a gain factor for the reconstruction band calculated by the gain factor calculator 528. Importantly, however, the first spectral portion in the frame is not influenced by the adjuster 526, but only the raw second portion for the reconstruction frame is influenced by the adjuster 526. To this end, the gain factor calculator 528 analyzes the source band or the raw second portion 523 and additionally analyzes the first spectral portion in the reconstruction band to finally find the correct gain factor 527 so that the energy of the adjusted frame output by the adjuster 526 has the energy $E_4$ when a scale factor band 7 is contemplated.

In this context, it is very important to evaluate the high frequency reconstruction accuracy of the present invention compared to HE-AAC. This is explained with respect to scale factor band 7 in FIG. 3a. It is assumed that a conventional encoder such as illustrated in FIG. 13a would detect the spectral portion 307 to be encoded with a high resolution as a "missing harmonics". Then, the energy of this spectral component would be transmitted together with a spectral envelope information for the reconstruction band such as scale factor band 7 to the decoder. Then, the decoder would recreate the missing harmonic. However, the spectral value, at which the missing harmonic 307 would be reconstructed by the conventional decoder of FIG. 13b would be in the middle of band 7 at a frequency indicated by reconstruction frequency 390. Thus, the present invention avoids a frequency error 391 which would be introduced by the conventional decoder of FIG. 13d.

In an implementation, the spectral analyzer is also implemented to calculating similarities between first spectral portions and second spectral portions and to determine, based on the calculated similarities, for a second spectral portion in a reconstruction range a first spectral portion matching with the second spectral portion as far as possible. Then, in this variable source range/destination range implementation, the parametric coder will additionally introduce into the second encoded representation a matching information indicating for each destination range a matching source range. On the decoder-side, this information would then be used by a frequency tile generator 522 of FIG. 5c illustrating a generation of a raw second portion 523 based on a source band ID and a target band ID.

Furthermore, as illustrated in FIG. 3a, the spectral analyzer is configured to analyze the spectral representation up to a maximum analysis frequency being only a small amount below half of the sampling frequency and advantageously being at least one quarter of the sampling frequency or typically higher.

As illustrated, the encoder operates without downsampling and the decoder operates without upsampling. In other words, the spectral domain audio coder is configured to generate a spectral representation having a Nyquist frequency defined by the sampling rate of the originally input audio signal.

Furthermore, as illustrated in FIG. 3a, the spectral analyzer is configured to analyze the spectral representation starting with a gap filling start frequency and ending with a maximum frequency represented by a maximum frequency included in the spectral representation, wherein a spectral portion extending from a minimum frequency up to the gap filling start frequency belongs to the first set of spectral portions and wherein a further spectral portion such as 304, 305, 306, 307 having frequency values above the gap filling frequency additionally is included in the first set of first spectral portions.

As outlined, the spectral domain audio decoder 112 is configured so that a maximum frequency represented by a spectral value in the first decoded representation is equal to a maximum frequency included in the time representation having the sampling rate wherein the spectral value for the maximum frequency in the first set of first spectral portions is zero or different from zero. Anyway, for this maximum frequency in the first set of spectral components a scale factor for the scale factor band exists, which is generated and transmitted irrespective of whether all spectral values in this scale factor band are set to zero or not as discussed in the context of FIGS. 3a and 3b.

The invention is, therefore, advantageous that with respect to other parametric techniques to increase compression efficiency, e.g. noise substitution and noise-filling (these techniques are exclusively for efficient representation of noise like local signal content) the invention allows an accurate frequency reproduction of tonal components. To date, no state-of-the-art technique addresses the efficient parametric representation of arbitrary signal content by spectral gap filling without the restriction of a fixed a-priory division in low band (LF) and high band (HF).

Embodiments of the inventive system improve the state-of-the-art approaches and thereby provides high compression efficiency, no or only a small perceptual annoyance and full audio bandwidth even for low bitrates.

The general system consists of
full band core coding
intelligent gap filling (tile filling or noise-filling)
sparse tonal parts in core selected by tonal mask
joint stereo pair coding for full band, including tile filling
TNS on tile
spectral whitening in IGF range A first step towards a more efficient system is to remove the need for transforming spectral data into a second transform domain different from the one of the core coder. As the majority of audio codecs, such as AAC for instance, use the MDCT as basic transform, it is useful to perform the BWE in the MDCT domain also. A second requirement for the BWE system would be the need to preserve the tonal grid whereby even HF tonal components are preserved and the quality of the coded audio is thus superior to the existing systems. To take care of both the above mentioned requirements a system has been proposed called Intelligent Gap Filling (IGF). FIG. 2b shows the block diagram of the proposed system on the encoder-side and FIG. 2a shows the system on the decoder-side.

Subsequently, a post-processing framework is described with respect to FIG. 13A and FIG. 13B in order to illustrate that the present invention can also be implemented in the high frequency reconstructer 1330 in this post-processing embodiment.

FIG. 13a illustrates a schematic diagram of an audio encoder for a bandwidth extension technology as, for example, used in High Efficiency Advanced Audio Coding (HE-AAC). An audio signal at line 1300 is input into a filter system comprising of a low pass 1302 and a high pass 1304. The signal output by the high pass filter 1304 is input into a parameter extractor/coder 1306. The parameter extractor/coder 1306 is configured for calculating and coding parameters such as a spectral envelope parameter, a noise addition parameter, a missing harmonics parameter, or an inverse filtering parameter, for example. These extracted parameters are input into a bit stream multiplexer 1308. The low pass output signal is input into a processor typically comprising the functionality of a down sampler 1310 and a core coder 1312. The low pass 1302 restricts the bandwidth to be encoded to a significantly smaller bandwidth than occurring in the original input audio signal on line 1300. This provides a significant coding gain due to the fact that the whole functionalities occurring in the core coder only have to operate on a signal with a reduced bandwidth. When, for example, the bandwidth of the audio signal on line 1300 is 20 kHz and when the low pass filter 1302 exemplarily has a bandwidth of 4 kHz, in order to fulfill the sampling theorem, it is theoretically sufficient that the signal subsequent to the down sampler has a sampling frequency of 8 kHz, which is a substantial reduction to the sampling rate necessitated for the audio signal 1300 which has to be at least 40 kHz.

FIG. 13b illustrates a schematic diagram of a corresponding bandwidth extension decoder. The decoder comprises a bitstream multiplexer 1320. The bitstream demultiplexer 1320 extracts an input signal for a core decoder 1322 and an input signal for a parameter decoder 1324. A core decoder output signal has, in the above example, a sampling rate of 8 kHz and, therefore, a bandwidth of 4 kHz while, for a complete bandwidth reconstruction, the output signal of a high frequency reconstructor 1330 has to be at 20 kHz necessitating a sampling rate of at least 40 kHz. In order to make this possible, a decoder processor having the functionality of an upsampler 1325 and a filterbank 1326 is necessitated. The high frequency reconstructor 1330 then receives the frequency-analyzed low frequency signal output by the filterbank 1326 and reconstructs the frequency range defined by the high pass filter 1304 of FIG. 13a using the parametric representation of the high frequency band. The high frequency reconstructor 1330 has several functionalities such as the regeneration of the upper frequency range using the source range in the low frequency range, a spectral envelope adjustment, a noise addition functionality and a functionality to introduce missing harmonics in the upper frequency range and, if applied and calculated in the encoder of FIG. 13a, an inverse filtering operation in order to account for the fact that the higher frequency range is typically not as tonal as the lower frequency range. In HE-AAC, missing harmonics are re-synthesized on the decoder-side and are placed exactly in the middle of a reconstruction band. Hence, all missing harmonic lines that have been determined in a certain reconstruction band are not placed at the frequency values where they were located in the original signal. Instead, those missing harmonic lines are placed at frequencies in the center of the certain band. Thus, when a missing harmonic line in the original signal was placed very close to the reconstruction band border in the original signal, the error in frequency introduced by placing this missing harmonics line in the reconstructed signal at the center of the band is close to 50% of the individual reconstruction band, for which parameters have been generated and transmitted.

Furthermore, even though the typical audio core coders operate in the spectral domain, the core decoder nevertheless generates a time domain signal which is then, again, converted into a spectral domain by the filter bank 1326 functionality. This introduces additional processing delays, may introduce artifacts due to tandem processing of firstly transforming from the spectral domain into the frequency domain and again transforming into typically a different frequency domain and, of course, this also necessitates a substantial amount of computation complexity and thereby electric power, which is specifically an issue when the bandwidth extension technology is applied in mobile devices such as mobile phones, tablet or laptop computers, etc.

Although some aspects have been described in the context of an apparatus for encoding or decoding, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a Hard Disk Drive (HDD), a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An audio decoder for generating an enhanced audio signal from an input audio signal, wherein the enhanced audio signal comprises spectral values for an enhancement spectral region, the spectral values for the enhancement spectral regions not being comprised in the input audio signal, comprising:
 a mapper configured for mapping a source spectral region of the input audio signal to a target region in the enhancement spectral region, the source spectral region comprising a noise-filling region; and
 a noise filler configured for generating first noise values for the noise-filling region in the source spectral region of the input audio signal and for generating second noise values for a noise region in the target region, wherein the second noise values are decorrelated from the first noise values,
 wherein the noise filler is configured for:
 identifying the noise-filling region comprising the first noise values in the input audio signal;
 copying at least a region of the input audio signal to a source tile buffer, the region comprising the source spectral region; and
 replacing the first noise values in the source tile buffer as identified by independent noise values; and
 wherein the mapper is configured to map the source tile buffer comprising decorrelated noise values to the target region, and
 wherein one or more of the mapper and the noise filler is implemented, at least in part, by one or more hardware elements of the audio decoder.

2. The audio decoder of claim 1,
 wherein the input audio signal is an encoded signal comprising noise-filling parameters for the source spectral region of the input audio signal,
 wherein the noise filler is configured for generating the first noise values using the noise-filling parameters and for generating the second noise values using an energy information on the first noise values.

3. The audio decoder of claim 1,
 wherein the noise filler is configured to measure an energy information on the decorrelated noise values and an energy information on the first noise values and to scale the decorrelated noise values using a scaling value derived from the energy information on the decorrelated noise values and the energy information on the first noise values.

4. The audio decoder of claim 1,
 wherein the noise filler is configured for generating the second noise values subsequent to an operation of the mapper or for generating the first and the second noise values subsequent to an operation of the mapper.

5. The audio decoder of claim 1,
 wherein the mapper is configured to map the source region to the target region, and
 wherein the noise filler is configured to perform noise-filling in spectral regions by generating the first noise values using noise-filling and noise-filling parameters transmitted in the input audio signal as side information, and to perform noise-filling in the target region to generate the second spectral values using energy information on the first noise values.

6. The audio decoder of claim 1, further comprising:
 an envelope adjuster configured for adjusting the second noise values in the enhancement spectral region using spectral envelope information comprised in the input audio signal as side information.

7. The audio decoder of claim 1,
 wherein the noise filler is configured to only use side information of the input audio signal to identify spectral positions for noise-filling, or
 wherein the noise filler is configured to analyze a time or spectral characteristic of the input audio signal with or without spectral values in the noise-filling region to identify spectral positions for noise-filling.

8. The audio decoder of claim 1,
 wherein the noise filler is configured to identify noise positions using an identification vector comprising entries for spectral positions in the source spectral region only, or comprising entries for spectral positions in the source spectral region and in the target region.

9. The audio decoder of claim 1,
 wherein the noise filler is configured to copy, in the copying operation, a complete spectral portion of the input audio signal or a complete spectral portion of the input audio signal above a noise-filling border frequency generally usable by the mapper to the source tile buffer and to perform the replacing operation on the full source tile buffer, or
 wherein the noise filler is configured to copy, in the copying operation, only a spectral region of the input audio signal identified by one or more specific source identifiers for a source region to be used by the mapper for the target region, where an individual source tile buffer is used for each different individual mapping operation.

10. The audio decoder of claim 1,
 wherein the mapper is configured to perform a gap filling operation for generating the target region, wherein the audio decoder further comprises:
 a spectral domain audio decoder configured for generating a first decoded representation of a first set of first spectral portions, the first decoded representation comprising a first spectral resolution;
 a parametric decoder configured for generating a second decoded representation of a second set of second spectral portions comprising a second spectral resolution being lower than the first spectral resolution;
 a frequency regenerator configured for regenerating a reconstructed second spectral portion comprising the first spectral resolution using a first spectral portion and spectral envelope information for the reconstructed second spectral portion; and
 a spectrum time converter configured for converting the first decoded representation and the reconstructed second spectral portion into a time representation,
 wherein the mapper and the noise filler are at least partly comprised in the frequency regenerator.

11. The audio decoder of claim 10,
wherein the spectral domain audio decoder is configured to output a sequence of decoded frames of spectral values, a decoded frame being the first decoded representation, wherein the decoded frame comprises spectral values for the first set of first spectral portions and zero indications for the second set of second spectral portions,
wherein the audio decoder further comprises a combiner for combining spectral values generated by the frequency regenerator for the second set of second spectral portions and spectral values of the first set of first spectral portions in a reconstruction band to acquire a reconstructed spectral frame comprising spectral values for the first set of first spectral portions and the second set of second spectral portions; and
wherein the spectrum-time converter is configured to convert the reconstructed spectral frame into the time representation.

12. The audio decoder of claim 1,
further comprising:
for the target region, a source spectral region identification, and
wherein the mapper is configured for selecting the source spectral region using the source spectral region identification and for mapping the selected source spectral region to the target region.

13. A method of audio decoding for generating an enhanced audio signal from an input audio signal, wherein the enhanced audio signal comprises spectral values for an enhancement spectral region, the spectral values for the enhancement spectral regions not being comprised in the input audio signal, comprising:
mapping a source spectral region of the input audio signal to a target region in the enhancement spectral region, the source spectral region comprising a noise-filling region; and
generating first noise values for the noise-filling region in the source spectral region of the input audio signal and generating second noise values for a noise region in the target region, wherein the second noise values are decorrelated from the first noise,
wherein the generating comprises:
identifying the noise-filling region comprising the first noise values in the input audio signal;
copying at least a region of the input audio signal to a source tile buffer, the region comprising the source spectral region; and
replacing the first noise values in the source tile buffer as identified by independent noise values; and
wherein the mapping comprises mapping the source tile buffer comprising decorrelated noise values to the target region; and
wherein one or more of the mapping, the generating, the identifying, the copying, and the replacing is implemented, at least in part, by one or more hardware elements of an audio signal processing device.

14. A system for processing an audio signal, comprising:
an encoder configured for generating an encoded signal; and
an apparatus audio decoder for generating an enhanced audio signal from an input audio signal, wherein the enhanced audio signal comprises spectral values for an enhancement spectral region, the spectral values for the enhancement spectral region not being comprised in the input audio signal, the audio decoder comprising:
a mapper configured for mapping a source spectral region of the input audio signal to a target region in the enhancement spectral region, the source spectral region comprising a noise-filling region; and
a noise filler configured for generating first noise values for the noise-filling region in the source spectral region of the input audio signal and for generating second noise values for a noise region in the target region, wherein the second noise values are decorrelated from the first noise values,
wherein the noise filler is configured for:
identifying the noise-filling region comprising the first noise values in the input audio signal;
copying at least a region of the input audio signal to a source tile buffer, the region comprising the source spectral region; and
replacing the first noise values in the source tile buffer as identified by independent noise values; and
wherein the mapper is configured to map the source tile buffer comprising decorrelated noise values to the target region,
wherein the encoded signal is subjected to a processing in order to generate the input audio signal into the audio decoder, and
wherein one or more of the encoder and the audio decoder is implemented, at least in part, by one or more hardware elements of the system for processing.

15. A method for processing an audio signal, comprising:
generating an encoded signal from the audio signal; and
a method of audio decoding for generating an enhanced audio signal from an input audio signal, wherein the enhanced audio signal comprises spectral values for an enhancement spectral region, the spectral values for the enhancement spectral regions not being comprised in the input audio signal, the method comprising:
mapping a source spectral region of the input audio signal to a target region in the enhancement spectral region, the source spectral region comprising a noise-filling region; and
generating first noise values for the noise-filling region in the source spectral region of the input audio signal and for generating second noise values for a noise region in the target region, wherein the second noise values are decorrelated from the first noise values,
wherein the generating the second noise values comprises:
identifying the noise-filling region comprising the first noise values in the input audio signal;
copying at least a region of the input audio signal to a source tile buffer, the region comprising the source spectral region; and
replacing the first noise values in the source tile buffer as identified by the independent noise values; and
wherein the mapping comprises mapping the source tile buffer comprising decorrelated noise values to the target region,
wherein the encoded signal is subjected to a predefined processing in order to generate the input audio signal into the method of audio decoding, and
wherein one or more of the generating an encoded signal, the mapping, the generating first or second noise values, the identifying the copying, and the replacing is implemented, at least in part, by one or more hardware elements of an audio signal processing device.

16. A non-transitory digital storage medium having a computer program stored thereon to perform, when said computer program is run by a computer or a processor, a method of audio decoding for generating an enhanced audio signal from an input audio signal, wherein the enhanced audio signal comprises spectral values for an enhancement spectral region, the spectral values for the enhancement spectral regions not being comprised in the input audio signal, the method comprising:

mapping a source spectral region of the input audio signal to a target region in the enhancement spectral region, the source spectral region comprising a noise-filling region; and generating first noise values for the noise-filling region in the source spectral region of the input audio signal and generating second noise values for a noise region in the target region, wherein the second noise values are decorrelated from the first noise values, wherein the generating the second noise values comprises:

identifying the noise-filling region comprising the first noise values in the input audio signal;

copying at least a region of the input audio signal to a source tile buffer, the region comprising the source spectral region; and replacing the first noise values in the source tile buffer as identified by the independent noise values; and wherein the mapping comprises mapping the source tile buffer comprising decorrelated noise values to the target region.

17. A non-transitory digital storage medium having a computer program stored thereon to perform, when said computer program is run by a computer or a processor, a method for processing an audio signal, the method comprising:

generating an encoded signal from the audio signal; and a method of audio decoding for generating an enhanced audio signal from an input audio signal, wherein the enhanced audio signal comprises spectral values for an enhancement spectral region, the spectral values for the enhancement spectral regions not being comprised in the input audio signal, comprising:

mapping a source spectral region of the input audio signal to a target region in the enhancement spectral region, the source spectral region comprising a noise-filling region; and generating first noise values for the noise-filling region in the source spectral region of the input audio signal and generating second noise values for a noise region in the target region, wherein the second noise values are decorrelated from the first noise values, wherein the generating the second noise values comprises:

identifying the noise-filling region comprising the first noise values in the input audio signal;

copying at least a region of the input audio signal to a source tile buffer, the region comprising the source spectral region; and replacing the first noise values in the source tile buffer as identified by independent noise values; and wherein the mapping comprises mapping the source tile buffer comprising decorrelated noise values to the target region, wherein the encoded signal is subjected to a predefined processing in order to generate the input audio signal into the method of audio decoding for generating the enhanced audio signal.

18. An audio decoder for generating an enhanced audio signal from an input audio signal, wherein the enhanced audio signal comprises spectral values for an enhancement spectral region, the spectral values for the enhancement spectral region not being comprised in the input audio signal, comprising:

a mapper configured for mapping a source spectral region of the input audio signal to a target region in the enhancement spectral region, the source spectral region comprising a noise-filling region; and a noise filler configured for generating second noise values for a noise region in the target region, wherein the second noise values are decorrelated from first noise values in the source spectral region, wherein the noise filler is configured for:

identifying the first noise values in the source spectral region;

copying at least a region of the input audio signal to a source tile buffer, the region comprising the source spectral region; and replacing the first noise values in the source tile buffer as identified by independent noise values; and wherein the mapper is configured to map the source tile buffer comprising decorrelated noise values to the target region, and wherein one or more of the mapper and the noise filler is implemented, at least in part, by one or more hardware elements of the audio decoder.

19. A method of audio decoding for generating an enhanced audio signal from an input audio signal, wherein the enhanced audio signal comprises spectral values for an enhancement spectral region, the spectral values for the enhancement spectral region not being comprised in the input audio signal, comprising:

mapping a source spectral region of the input audio signal to a target region in the enhancement spectral region, the source spectral region comprising a noise-filling region; and generating second noise values for a noise region in the target region, wherein the second noise values are decorrelated from first noise values in the source region, wherein the generating comprises:

identifying the first noise values in the input audio signal;

copying at least a region of the input audio signal to a source tile buffer, the region comprising the source spectral region; and replacing the first noise values in the source tile buffer as identified by independent noise values; and wherein the mapping comprises mapping the source tile buffer comprising decorrelated noise values to the target region, and wherein one or more of the mapping, the generating, the identifying, the copying, and the replacing is implemented, at least in part, by one or more hardware elements of an audio signal processing device.

20. A non-transitory digital storage medium having a computer program stored thereon to perform, when said computer program is run by a computer or a processor, the method of audio decoding for generating an enhanced audio signal from an input audio signal, wherein the enhanced audio signal comprises spectral values for an enhancement spectral region, the spectral values for the enhancement spectral region not being comprised in the input audio signal, the method comprising:
- mapping a source spectral region of the input audio signal to a target region in the enhancement spectral region, the source spectral region comprising a noise-filling region; and
- generating second noise values for a noise region in the target region, wherein the second noise values are decorrelated from first noise values in the source spectral region,
- wherein the generating comprises:
  - identifying the first noise values in the input audio signal;
  - copying at least a region of the input audio signal to a source tile buffer, the region comprising the source spectral region; and
  - replacing the first noise values in the source tile buffer as identified by independent noise values; and
- wherein the mapping comprises mapping the source tile buffer comprising decorrelated noise values to the target region.

21. A system for processing an audio signal, comprising:
an encoder configured for generating an encoded signal; and
an audio decoder for generating an enhanced audio signal from an input audio signal, wherein the enhanced audio signal comprises spectral values for an enhancement spectral region, the spectral values for the enhancement spectral region not being comprised in the input audio signal, the audio decoder comprising:
a mapper configured for mapping a source spectral region of the input audio signal to a target region in the enhancement spectral region; and
a noise filler configured for generating second noise values for a noise region in the target region, wherein the second noise values are decorrelated from first noise values in the source spectral region,
wherein the noise filler is configured for:
  identifying the first noise values in the source spectral region;
  copying at least a region of the input audio signal to a source tile buffer, the region comprising the source spectral region; and
  replacing the first noise values in the source tile buffer as identified by independent noise values; and
wherein the mapper is configured to map the source tile buffer comprising decorrelated noise values to the target region, and
wherein the encoded signal is subjected to a processing in order to generate the input audio signal into the audio decoder, and
wherein one or more of the encoder and the audio decoder is implemented, at least in part, by one or more hardware elements of the system for processing.

22. A method for processing an audio signal, comprising:
generating an encoded signal from the audio signal; and
a method of audio decoding for generating an enhanced audio signal from an input audio signal, wherein the enhanced audio signal comprises spectral values for an enhancement spectral region, the spectral values for the enhancement spectral region not being comprised in the input audio signal, the method comprising:
  mapping a source spectral region of the input audio signal to a target region in the enhancement spectral region; and
  generating second noise values for a noise region in the target region, wherein the second noise values are decorrelated from first noise values in the source region,
  wherein the generating comprises:
    identifying the first noise values in the input audio signal;
    copying at least a region of the input audio signal to a source tile buffer, the region comprising the source spectral region; and
    replacing the first noise values in the source tile buffer as identified by independent noise values; and
  wherein the mapping comprises mapping the source tile buffer comprising decorrelated noise values to the target region,
wherein the encoded signal is subjected to a predefined processing in order to generate the input audio signal into the method of audio decoding, and
wherein one or more of the generating an encoded signal, the mapping, the generating second noise values, the identifying, the copying, and the replacing is implemented, at least in part, by one or more hardware elements of an audio signal processing device.

23. A non-transitory digital storage medium having a computer program stored thereon to perform, when said computer program is run by a computer or a processor, a method for processing an audio signal, the method comprising:
generating an encoded signal from the audio signal; and
a method of audio decoding for generating an enhanced audio signal from an input audio signal, wherein the enhanced audio signal comprises spectral values for an enhancement spectral region, the spectral values for the enhancement spectral region not being comprised in the input audio signal, comprising:
  mapping a source spectral region of the input audio signal to a target region in the enhancement spectral region; and
  generating second noise values for a noise region in the target region, wherein the second noise values are decorrelated from first noise values in the source region,
  wherein the generating comprises:
    identifying the first noise values in the input audio signal;
    copying at least a region of the input audio signal to a source tile buffer, the region comprising the source spectral region; and
    replacing the first noise values in the source tile buffer as identified by independent noise values; and
  wherein the mapping comprises mapping the source tile buffer comprising decorrelated noise values to the target region,
wherein the encoded signal is subjected to a predefined processing in order to generate the input audio signal into the method of audio decoding for generating the enhanced audio signal.

* * * * *